(12) United States Patent
Schmidt et al.

(10) Patent No.: US 10,596,989 B2
(45) Date of Patent: Mar. 24, 2020

(54) DRIVER'S BARRIER DOOR WITH POWERED WINDOW

(71) Applicant: Westinghouse Air Brake Technologies Corporation, Wilmerding, PA (US)

(72) Inventors: Timothy R. Schmidt, Wheeling, IL (US); Matthew Chapman, Wheeling, IL (US); Karl J. Kobel, Wildwood, IL (US); Richard Peck, Richmond, IL (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 61 days.

(21) Appl. No.: 15/592,797

(22) Filed: May 11, 2017

(65) Prior Publication Data

US 2017/0327070 A1    Nov. 16, 2017

Related U.S. Application Data

(60) Provisional application No. 62/335,235, filed on May 12, 2016, provisional application No. 62/335,281, filed on May 12, 2016.

(51) Int. Cl.
    *B60R 21/12*    (2006.01)
(52) U.S. Cl.
    CPC .................................... *B60R 21/12* (2013.01)
(58) Field of Classification Search
    CPC . B63B 25/004; B63B 25/28; B63B 2025/285; B65D 90/0006; B65D 88/12; B64D 9/003; B61D 45/007; B61D 3/20; B61D 45/002; B60P 7/13; B60P 7/18; B60P 7/16; B60P 7/10; F16G 11/12
    USPC ...... 410/85, 77, 100, 96, 97, 80, 81; 114/75; 248/499; 403/43–45, 48
    See application file for complete search history.

(56) References Cited

U.S. PATENT DOCUMENTS

| | | | |
|---|---|---|---|
| 1,631,357 | A | 6/1927 | Blair et al. |
| 2,051,428 | A | 8/1936 | Tatlow |
| 2,134,993 | A | 11/1938 | Wimmenauer |
| 2,187,099 | A | 1/1940 | Rodemeyer |
| 2,200,251 | A | 5/1940 | Atwood |

(Continued)

FOREIGN PATENT DOCUMENTS

| | | |
|---|---|---|
| AU | 1990067047 | 6/1991 |
| AU | 1993033998 | 9/1993 |

(Continued)

*Primary Examiner* — Stephen T Gordon
(74) *Attorney, Agent, or Firm* — Christopher R. Carroll; The Small Patent Law Group LLC

(57) ABSTRACT

A barrier door for a protective enclosure includes a lower section and an upper section. The upper section includes an outer stationary portion and an inner movable portion disposed within the outer stationary portion. The outer stationary portion and the inner movable portion are light transmissive. The inner movable portion is movable in a vertical direction and is coupled to a lift device disposed in the lower section. The lift device is configured to move the inner movable portion between a lowered position in which the inner movable portion is at least partially withdrawn into the lower section to form an opening in the upper section and a raised position in which the inner movable portion is extended to close the opening.

38 Claims, 32 Drawing Sheets

(56) References Cited

U.S. PATENT DOCUMENTS

| | | |
|---|---|---|
| 3,076,163 A | 1/1963 | Nodge et al. |
| 3,089,202 A | 5/1963 | Pulaski |
| 3,549,195 A | 12/1970 | Kallinikos |
| 3,630,812 A | 12/1971 | Bruckner et al. |
| 4,227,735 A | 10/1980 | Joyner |
| 4,509,788 A | 4/1985 | Jan et al. |
| 4,522,359 A | 6/1985 | Church et al. |
| 4,671,582 A | 6/1987 | Stromquist et al. |
| 4,720,065 A | 1/1988 | Hamatani |
| 5,004,286 A | 4/1991 | Taylor, III et al. |
| 5,343,662 A | 9/1994 | Nelson |
| 5,421,125 A | 6/1995 | Camp et al. |
| 5,809,707 A | 9/1998 | Bargados et al. |
| 6,364,397 B1 | 4/2002 | Bordeaux et al. |
| 6,474,713 B1 * | 11/2002 | Ruck .................. B60R 21/026 296/24.43 |
| 7,032,946 B1 | 4/2006 | Brown |
| 7,360,823 B2 | 4/2008 | Nakayama et al. |
| 7,891,725 B2 | 2/2011 | Blair |
| D667,357 S | 9/2012 | Lee |
| 8,272,674 B2 | 9/2012 | Vance |
| D669,413 S | 10/2012 | Lee |
| 8,434,805 B1 | 5/2013 | Bonniville |
| 8,833,831 B2 | 9/2014 | Manzke, Jr. |
| D731,397 S | 6/2015 | Manzke, Jr. |
| 2002/0180229 A1 | 12/2002 | Wheat |
| 2003/0014920 A1 | 1/2003 | Lu |
| 2003/0222175 A1 | 12/2003 | Movsesian et al. |
| 2006/0055206 A1 | 3/2006 | Morrow et al. |
| 2006/0123598 A1 | 6/2006 | Park |
| 2006/0175870 A1 | 8/2006 | Shioji et al. |
| 2007/0180868 A1 | 8/2007 | Hur |
| 2007/0252400 A1 | 11/2007 | Blair |
| 2009/0279234 A1 | 11/2009 | Lee |
| 2010/0154343 A1 | 6/2010 | Dammers |
| 2010/0270818 A1 | 10/2010 | Mills |
| 2012/0001454 A1 | 1/2012 | Murakami et al. |
| 2012/0068490 A1 | 3/2012 | Vance |
| 2013/0125483 A1 | 5/2013 | Yoon |
| 2014/0165331 A1 | 6/2014 | Kang et al. |
| 2014/0210225 A1 * | 7/2014 | Manzke, Jr. ............ B60R 21/12 296/24.4 |
| 2015/0069782 A1 | 3/2015 | Potts et al. |

FOREIGN PATENT DOCUMENTS

| | | |
|---|---|---|
| CH | 112928 A | 12/1925 |
| CN | 2322843 Y | 6/1999 |
| CN | 102582847 B | 12/2014 |
| CN | 205533751 U | 8/2016 |
| DE | 1584272 A | 2/1969 |
| DE | 3738753 C1 | 6/1989 |
| DE | 4215566 A1 | 10/1992 |
| DE | 4210173 A1 | 9/1993 |
| DE | 9308894 U1 | 9/1993 |
| DE | 19530017 C1 | 11/1996 |
| DE | 19530016 C2 | 5/1997 |
| DE | 19904632 C2 | 2/2002 |
| DE | 4224619 C2 | 7/2002 |
| DE | 202011101051 U1 | 9/2011 |
| EP | 0409767 B1 | 9/1993 |
| EP | 0451529 B1 | 11/1994 |
| EP | 2428411 B1 | 8/2012 |
| EP | 2840216 A1 | 2/2015 |
| FR | 2742472 B1 | 3/1999 |
| FR | 2878812 A1 | 6/2006 |
| FR | 2878800 B1 | 2/2007 |
| FR | 2900262 A1 | 10/2007 |
| GB | 205480 | 4/1924 |
| GB | 232547 | 1/1926 |
| GB | 869191 | 5/1961 |
| GB | 1106408 | 3/1968 |
| GB | 2436090 B | 12/2010 |
| GB | 2521341 A | 6/2015 |
| KR | 1019990050638 A | 7/1999 |
| KR | 100559045 B1 | 3/2006 |
| KR | 1020060121429 A | 11/2006 |
| KR | 101047789 B1 | 7/2011 |
| KR | 1020160066404 A | 6/2016 |
| KR | 1020170033857 A | 3/2017 |
| KR | 101731953 B1 | 5/2017 |
| RU | 2224862 C1 | 2/2004 |
| WO | 2011124950 A1 | 10/2011 |

* cited by examiner

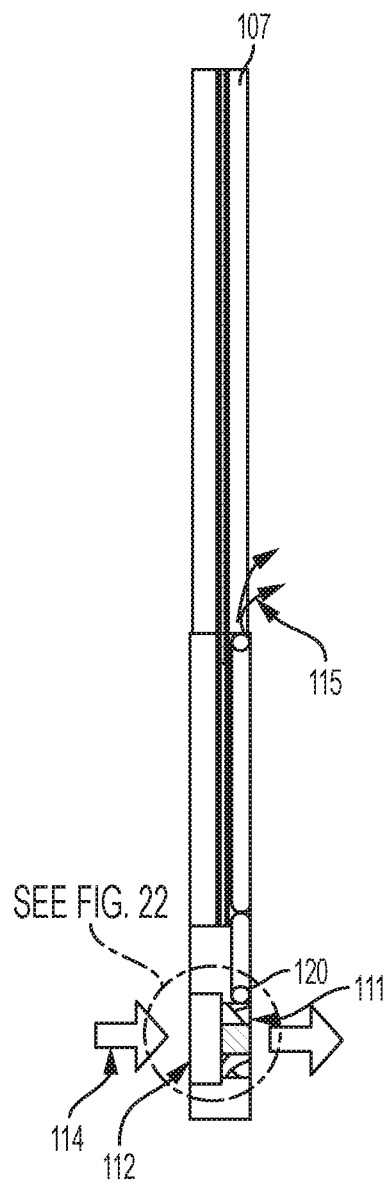
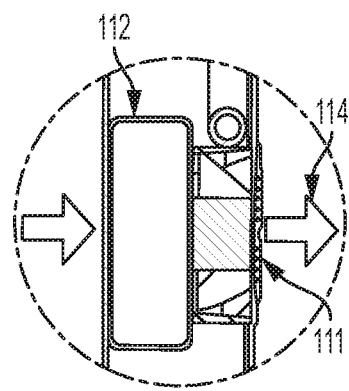
FIG. 21
FIG. 22

DRIVER'S BARRIER DOOR WITH POWERED WINDOW

CROSS REFERENCE TO RELATED APPLICATIONS

The present application claims priority from U.S. Provisional Patent Application No. 62/335,235, filed on May 12, 2016, and U.S. Provisional Patent Application No. 62/335,281, filed on May 12, 2016, both of which are hereby incorporated by reference in their entireties.

BACKGROUND OF THE INVENTION

Field of the Invention

The present invention relates to barrier doors for use in isolating and protecting the drivers of buses, trains, and other modes of public transit. More particularly, the present invention relates to a barrier door incorporating a movable window or panel that retracts into the door to allow for better ventilation and improved interaction with customers. The barrier door may also incorporate a ventilation system to allow for improved ventilation and air circulation in a driver's enclosure.

Description of Related Art

For many years, it has been desirable to provide public transit operators, such as bus drivers, with a protective enclosure so as to substantially isolate the driver from occupants within the vehicle. Not only does such an enclosure help prevent assaults on the driver, but it also limits distractions from other occupants that may divert the driver's attention away from safe operation of the vehicle. Thus, the enclosure not only protects the driver, but also aids in protecting passengers and other users of the roadway by helping to limit unnecessary distractions.

Known enclosures generally include a fixed rear barrier, located behind the driver, along with a barrier door that enables the driver to enter and exit the operator's station. These barrier doors often include a solid bottom portion made of either a transparent or non-transparent material, along with a clear window portion above the solid bottom portion to allow the driver to sufficiently view side mirrors, entrance areas to the vehicle, etc. In some instances, these window portions are not movable with respect to the barrier door. For example, U.S. Pat. No. 8,833,831 discloses a barrier door for a bus which incorporates a protective window panel, but no portion of the protective window panel may be opened or moved in any way relative to the barrier door. On the other hand, there are other known barrier doors incorporating clear window portions that may be opened (or partially opened) by the driver. For instance, U.S. Pat. Nos. 4,227,735 and 5,004,286 each disclose protective enclosures for buses, wherein the enclosure door comprises a manually-slideable window on an upper portion thereof. EP 2428411 discloses a protective barrier for a driver which incorporates a movable window comprised of multiple telescopic panes extending substantially across the width of the vehicle at a location behind the driver.

While barrier doors incorporating movable windows are known, such doors generally require manual opening and closing by the driver. Such a configuration is not only inconvenient for the driver, but it may also lead to distractions while operating the vehicle, as well as ergonomic concerns. Furthermore, a manually-operable window may be more susceptible to manipulation by a passenger, thereby reducing the protective effect of the barrier door itself. Other known barrier doors may incorporate a pneumatic assist for a manual opening and closing of the doors, but such pneumatic systems increase the complexity of the overall enclosure system.

Further, it is often undesirable for the operator to leave the window(s) open, as doing so may negate the protective nature of the barrier door. However, leaving the window(s) closed prevents optimal ventilation and air flow through the operator's station, as the existing heating and air conditioning vents in and around the operator's station may have been originally designed to work in a space that did not incorporate a retrofitted barrier door. The heating and air conditioning vents in and around the operator's station may not be individually controllable so as to allow the operator to provide additional localization as needed. Such a configuration is not only uncomfortable for the operator, but it may also lead to fogging of the window(s) of the barrier door under certain conditions, thereby decreasing the operator's visibility. Furthermore, the large windshield in front of the operator's station can create a large heat load, which may discourage the operator from using the barrier door at all.

SUMMARY OF THE INVENTION

The present disclosure provides a barrier door for a protective enclosure which incorporates an automatically-operated window panel therein, wherein the barrier door provides both protection and reduced distraction for the driver. The present disclosure also provides a barrier door for a protective enclosure which incorporates a powered ventilation system therein, wherein the barrier door provides both protection and increased comfort for the driver. The powered ventilation system ideally incorporates one or more blower fans to allow the driver to control the level of ventilation. Additionally, the powered ventilation system may include a heating and/or cooling element to provide an additional level of comfort control. It is also desirable to be able to open a portion of the barrier temporarily for customer interaction, to improve airflow, or for driver while being able to rapidly close the barrier.

In accordance with some aspects of the disclosure, a barrier door for use in a protective enclosure may have a lower section formed of at least one of a transparent, semi-transparent, or non-transparent material, an upper section formed of at least one substantially transparent material, and a transparent window movable between the lower section and the upper section. The transparent window is coupled to an electromechanical lift device housed in the lower section, and the transparent window, when moved into the lower section, only opens a portion of the upper section.

In accordance with other aspects of the disclosure, the upper section may further comprise an anti-rattle pocket configured to accept a portion of the transparent window when the transparent window is moved into the upper section. Furthermore, the electromechanical lift device may be a driven cable-type window regulator. The lower section may comprise at least one channel to support the transparent window. The upper section may comprise a non-movable transparent section, with the non-movable transparent section extending wider than the lower section.

In accordance with some other aspects of the disclosure, a barrier door for use in a protective enclosure surrounding a vehicle operator is shown and described, the barrier door comprising a lower section, an upper section formed of at least one substantially transparent material, and at least one electric blower located in a plenum of the lower section, the at least one electric blower configured to blow air into or out of the protective enclosure to provide improved ventilation and air flow to a vehicle operator.

In accordance with other aspects of the disclosure, the barrier door may comprise two electric blowers, wherein the electric blowers may blow air in either the same direction or in different directions, respectively. Additionally, the electric blower may incorporate at least one of a heating and cooling element.

According to one example of the present disclosure, a barrier door for a protective enclosure is provided. The barrier door comprises a lower section and an upper section, the upper section comprising an outer stationary portion and an inner movable portion disposed within the outer stationary portion. The outer stationary portion and the inner movable portion are light transmissive. The inner movable portion is movable in a vertical direction and is coupled to a lift device disposed in the lower section. The lift device is configured to move the inner movable portion between a lowered position in which the inner movable portion is at least partially withdrawn into the lower section to form an opening in the upper section and a raised position in which the inner movable portion is extended to close the opening.

According to another example of the present disclosure, a barrier door for a protective enclosure is provided. The barrier door comprises a lower section; an upper section, the upper section being light transmissive; and a ventilation system disposed within the lower section, the ventilation system comprising at least one blower and a plenum. The ventilation system is configured to direct air to or from the protective enclosure.

According to another example of the present disclosure, a driver's protective enclosure for a transit vehicle is provided. The protective enclosure comprises a rear screen disposed behind a driver's position in the protective enclosure; a barrier door, the barrier door comprising a lower section and an upper section, the upper section comprising an outer stationary portion and an inner movable portion disposed within the outer stationary portion; and a hinge structure connecting the barrier door to the rear screen. The outer stationary portion and the inner movable portion are light transmissive. The inner movable portion is movable in a vertical direction and is coupled to a lift device disposed in the lower section. The lift device is configured to move the inner movable portion between a lowered position in which the inner movable portion is at least partially withdrawn into the lower section to form an opening in the upper section and a raised position in which the inner movable portion is extended to close the opening.

These and other features and characteristics of the present invention, as well as the methods of operation and functions of the related elements of structures, and the combination of parts and economies of manufacture will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only, and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

FIG. 21 is a cross-sectional view of the barrier door of FIG. 20;

FIG. 22 is an enlarged view of area XXII shown in FIG. 21;

DETAILED DESCRIPTION OF THE INVENTION

Figure 1:
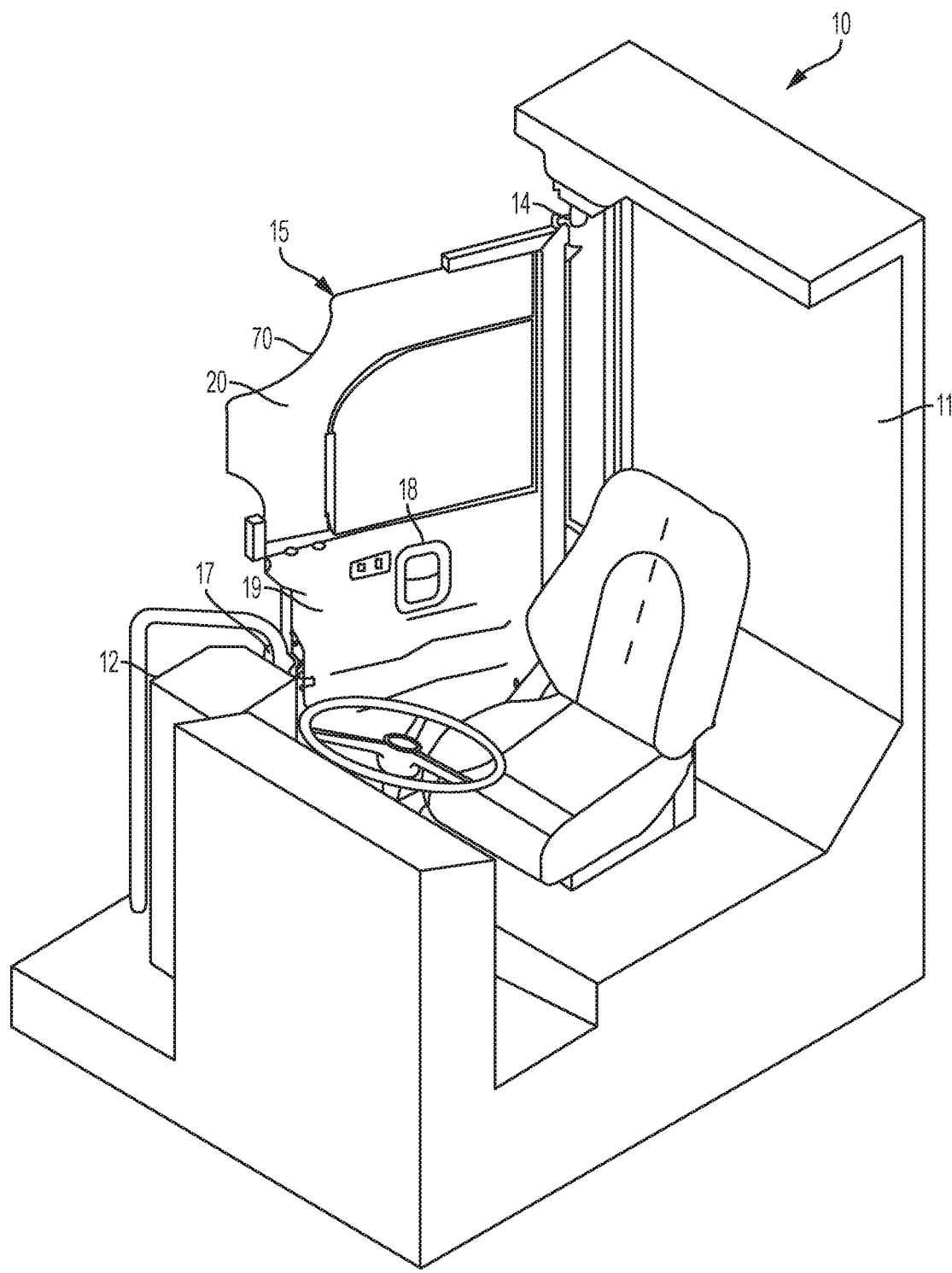
FIG. 1 is an interior perspective view of a driver's protective enclosure having a barrier door according to an example of the present disclosure.

For purposes of the description hereinafter, the terms "end", "upper", "lower", "right", "left", "vertical", "horizontal", "top", "bottom", "lateral", "longitudinal", "forward", "rearward", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

With reference to FIGS. 1-17, a driver's protective enclosure 10 for a transit vehicle, such as a bus, subway car, trolley car, or similar vehicle, is shown according to an example of the present disclosure. According to the depicted example, the transit vehicle is a bus. The driver's protective enclosure 10 incorporates an operator's station for the vehicle, including the driver's seat, driver's wheel, and other vehicle controls. The driver's protective enclosure 10 includes a rear screen 11 disposed behind the driver's position in the protective enclosure 10 and a barrier door 15 that moves between open and closed positions to allow and limit access to the driver's protective enclosure 10. A hinge structure 14 pivotably connects the barrier door 15 to the rear screen 11.

Figure 2:
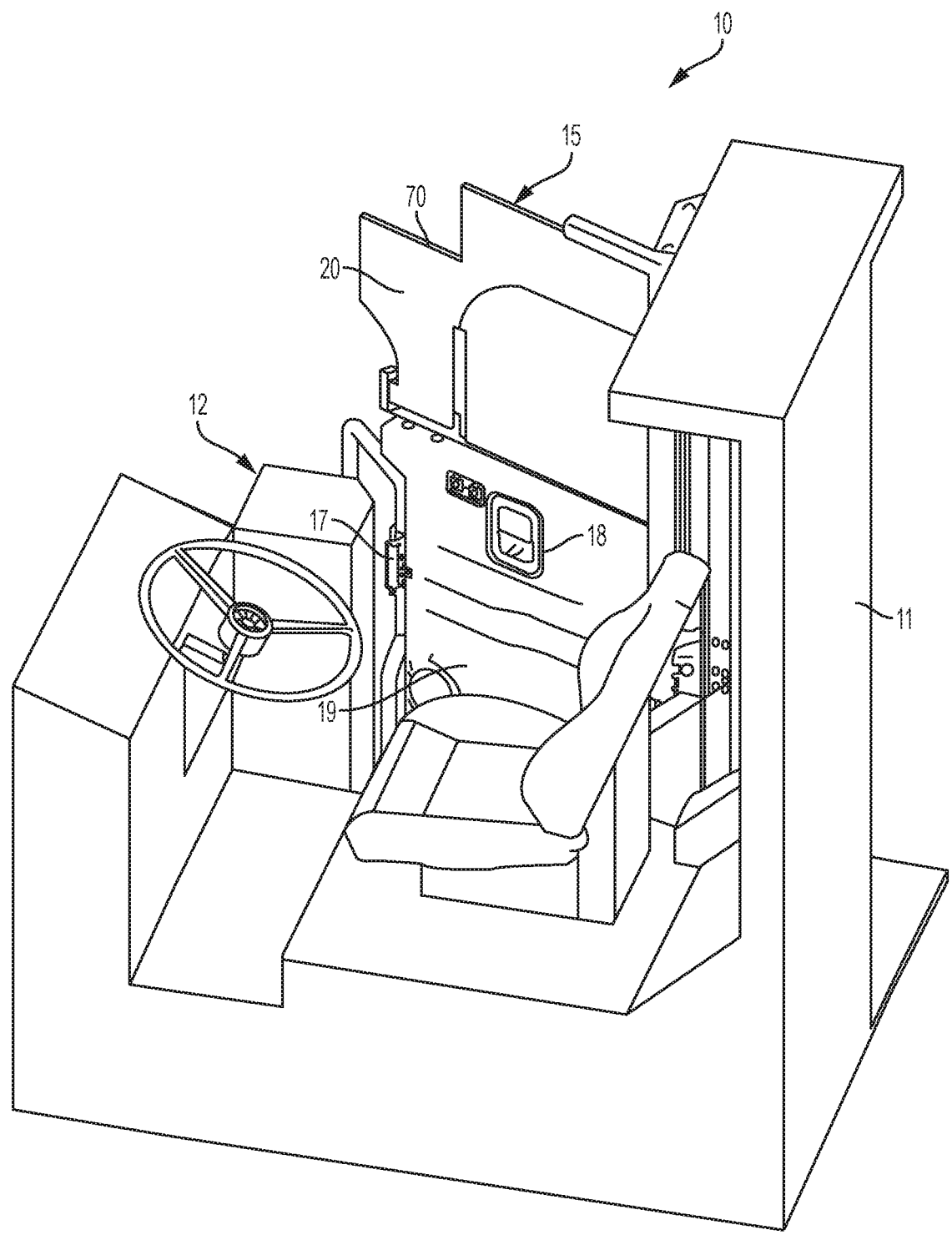
FIG. 2 is another interior perspective view of the driver's protective enclosure of FIG. 1.
Figure 3:
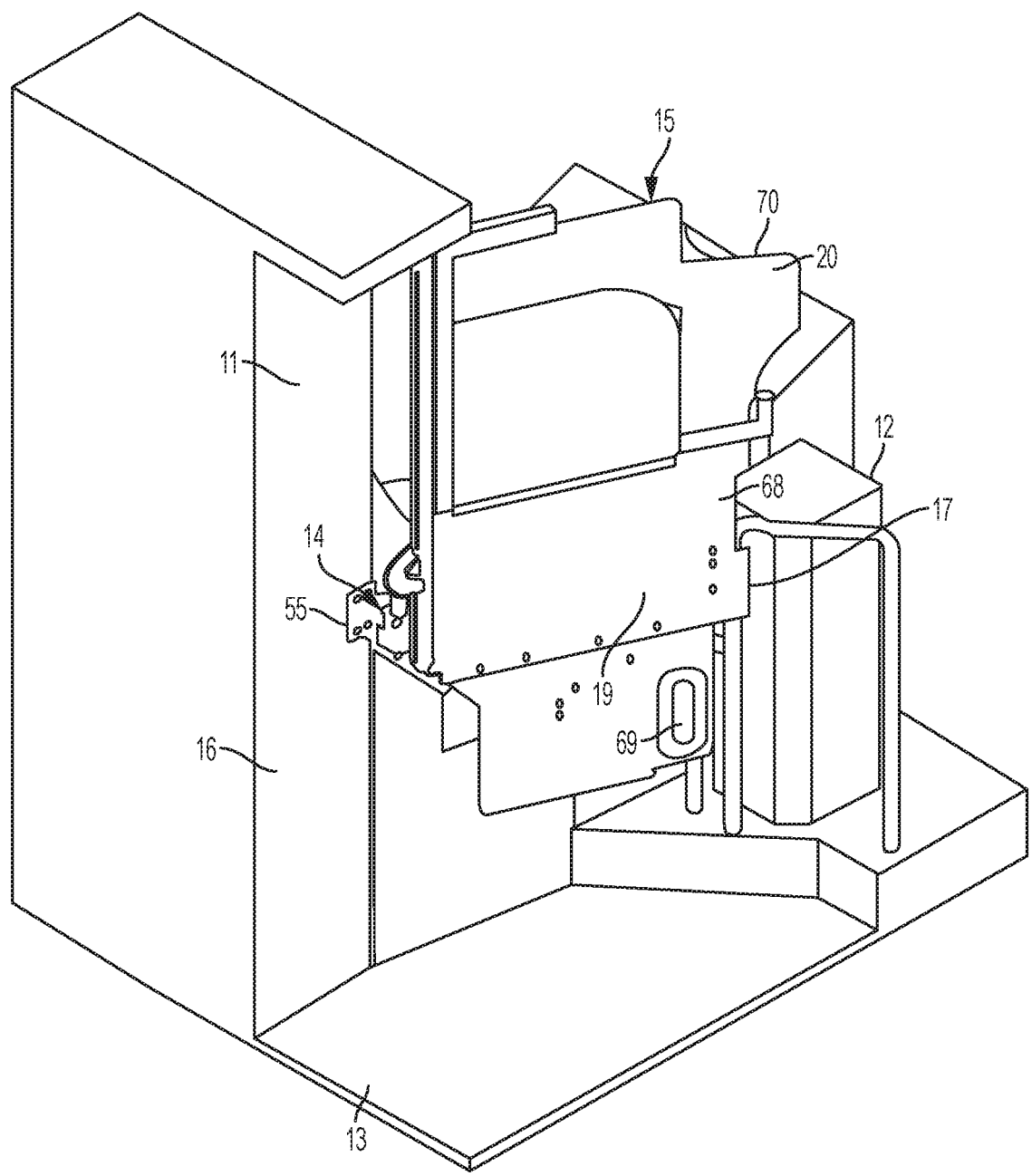
FIG. 3 is an exterior perspective view of the driver's protective enclosure of FIG. 1.

As shown in FIGS. 1-3, the driver's protective enclosure 10 is located at the left front of the bus. The rear screen 11 may be pre-installed on the bus without the barrier door 15. If installed, a fare box 12 is generally located to the right and forward of the driver's position when the bus is configured for driving on the right side of a roadway. To provide clearance for wheelchair access on the bus, the barrier door 15 may be provided with sufficient clearance from a right wheel well and above a floor level 13 of the vehicle according to government guidelines. It is appreciated that the barrier door 15 may extend to the floor level 13 or just above the floor level 13. The barrier door 15 is positioned with respect to the operator's station to provide adequate space for the driver to comfortably sit and access all controls.

The hinge structure 14 connects the rearward side of the barrier door 15 to the edge of the rear screen 11. The hinge structure 14 and the barrier door 15 may be configured to allow for the barrier door 15 to pivot through the aisle and stow against a structure 16 of the rear screen 11 directly behind barrier door 15. Alternatively, the hinge structure 14 and the barrier door 15 may be structured to prevent the barrier door 15 from fully opening.

The barrier door 15 includes a latch 17 on the forward side thereof to secure the barrier door 15 in a closed position. A latch release control 18 is provided on the barrier door 15 for actuating the latch 17. The latch release control 18 may be positioned in such a way to make the latch 17 accessible from outside the driver's protective enclosure 10 in case of an emergency, but be sufficiently obscured from the exterior of the driver's protective enclosure 10 to deter an attacker from attempting to open the barrier door 15. It is to be appreciated that the latch 17 and the latch release control 18 may be provided in any configuration known to be suitable to those having ordinary skill in the art.

As shown in FIGS. 1-6, according to an example of the present disclosure, the latch release control 18 includes a two-action door latch mechanism. Such a mechanism may be constructed using a variety of commercially available latch handles or with an integral mechanism. The latch release control 18 includes an actuation lever 66 that, when pulled, unlatches the barrier door 15. An additional control 67, such as a knob, activates a second mechanism that will disable the latch release control 18 by removing the mechanical link to the latch 17 or by preventing the motion of the actuation lever 66. Various mechanisms for performing either of these functions are known to those having ordinary skill in the art. The actuation lever 66 and the additional control knob 67 are accessible from outside the protective enclosure 10 but not easily accessible or obvious from outside the protective enclosure 10. The two-action mechanism is configured to allow a person to gain access to the protective enclosure from outside while adding additional steps to the process of opening the barrier door 15 from the closed position to slow down and impede an attacker. The driver must actively engage the latch release control 18 to require actuation of the two-action mechanism to open the barrier door 15. If the driver does not actively engage the latch release control 18 to require the two-action actuation, the latch release control 18 remains a single action control actuated via the actuation lever 66. According to an alternative example, the additional control knob 67 of the latch release control 18 is engaged by default and the latch release control 18 is always a dual action control. According to this example, the driver does not need to anticipate an attack and actively operate the latch release control 18 to require dual actuation, but the latch release control 18 is less convenient to actuate to open the barrier door 15 at all times.

Figure 4:
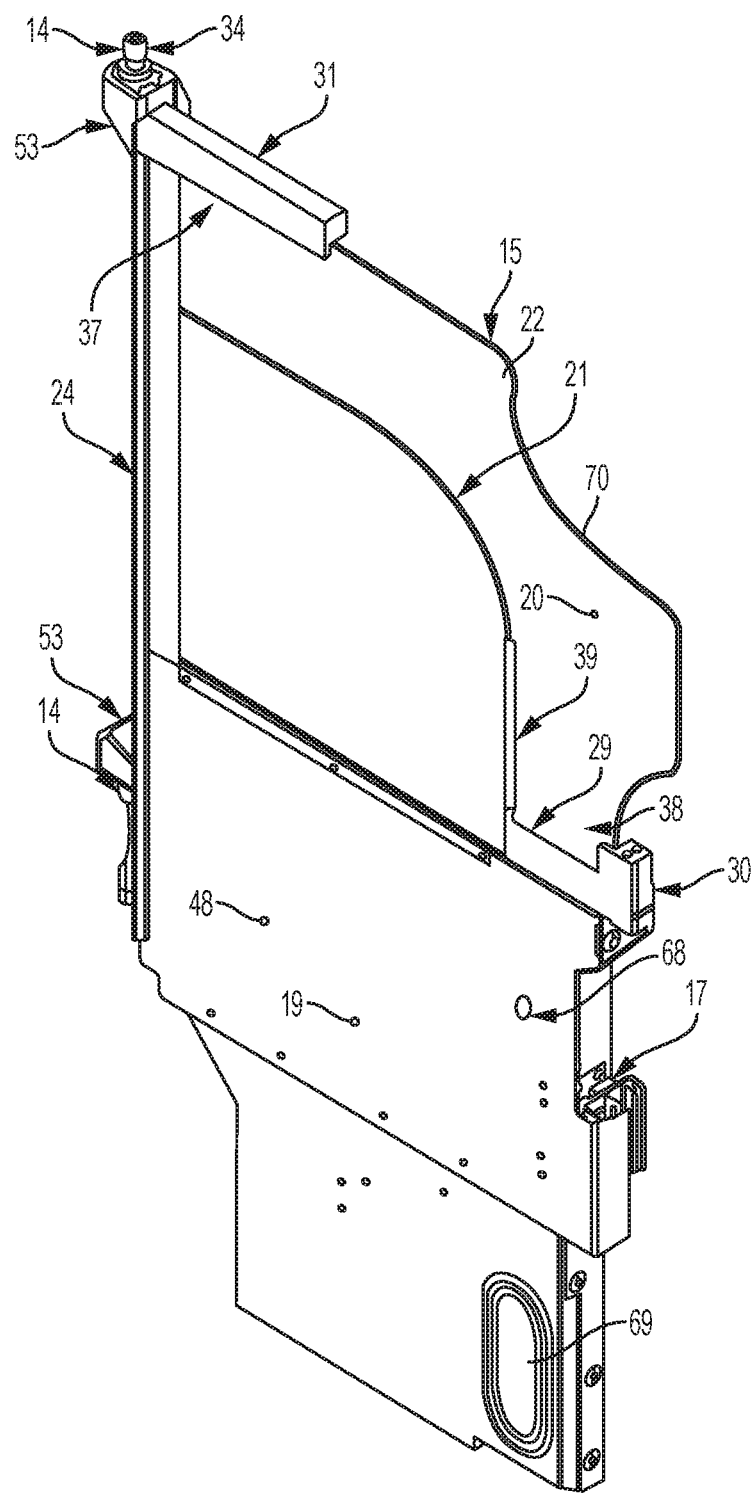
FIG. 4 is an exterior side perspective view of the barrier door of the driver's protective enclosure of FIG. 1.
Figure 5:
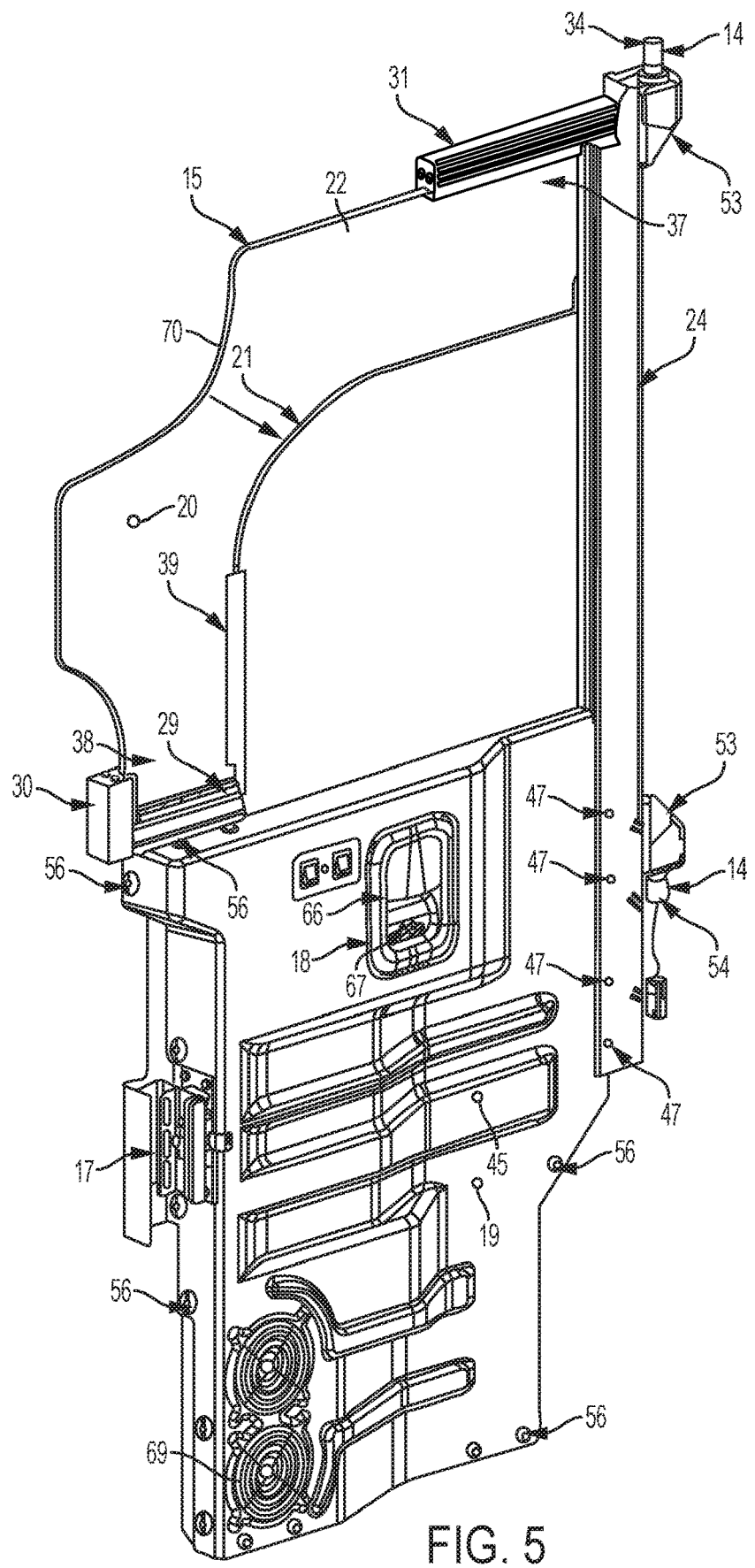
FIG. 5 is an interior side perspective view of the barrier door of FIG. 4.
Figure 6:
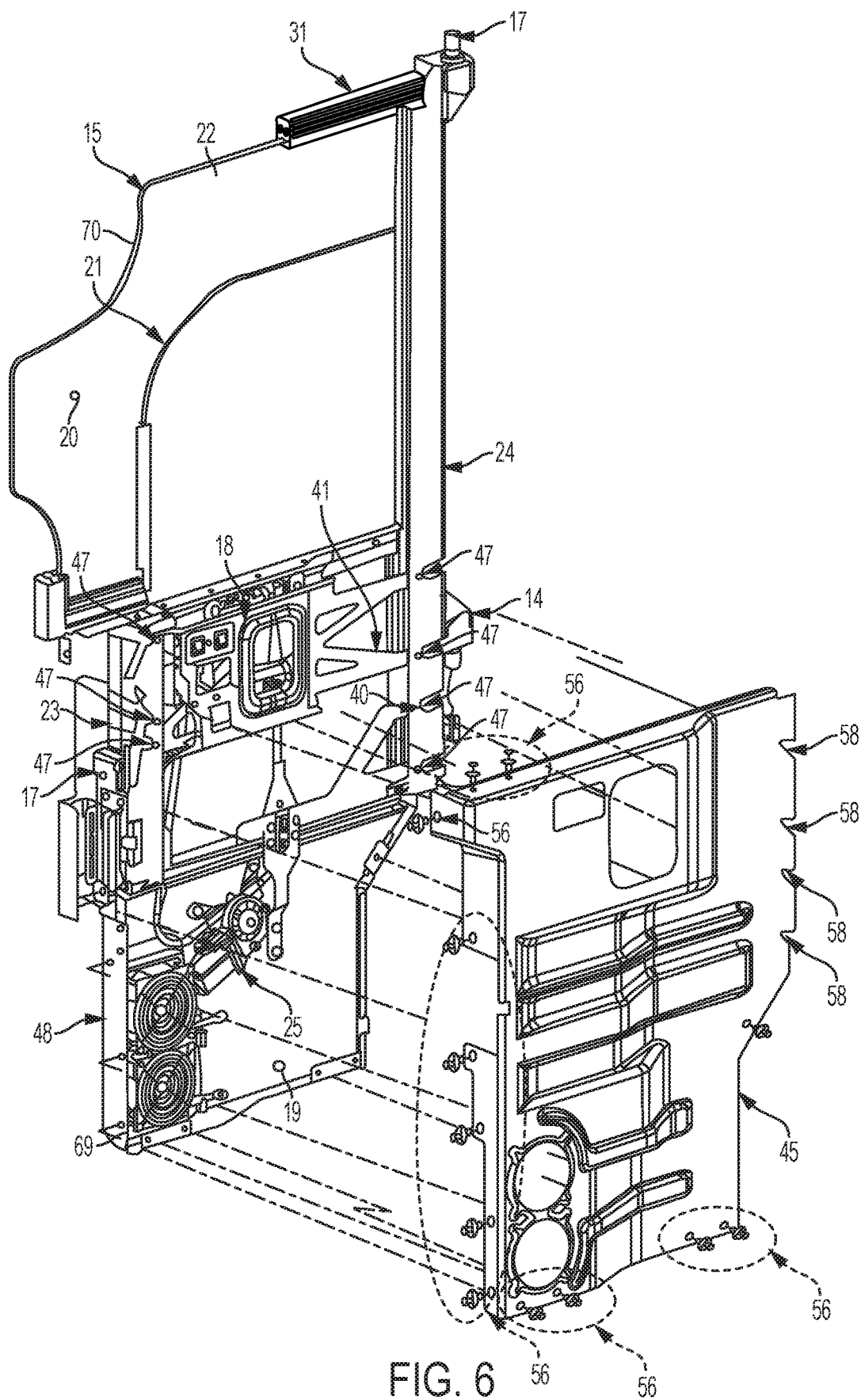
FIG. 6 is an interior side perspective view of the barrier door of FIG. 4 with the lower section exploded.

As shown in FIG. 4, the exterior side of the barrier door 15 may be provided with an additional unlatch control 68, such as a keyed quarter-turn latch or a quarter-turn latch using a square key, which allows for access to the protective enclosure 10 from the outside. The exterior unlatch control 68 is locked and would require a key, pass card, etc. or a specific or specialized tool, such as a square tool key, hex key, hex wrench, etc. to unlock or actuate the unlatch control 68. The driver is provided with an appropriate key, device, or tool to allow easier access to the protective enclosure 10 from outside. Emergency services personnel may also be provided with the key, device, or tool. The interior latch release control 18 is also accessible from the outside in the event of an emergency.

As shown in FIGS. 3-6 and 12, the barrier door 15 may include a ventilation system 69 disposed in a lower section 19 of the barrier door 15. The ventilation system 69 is configured to direct air to or from the protective enclosure 10. Additional details concerning the ventilation system 69 will be provided below with respect to the example of FIGS. 18-25.

As shown in FIGS. 1-6 and 12, the barrier door 15 includes the lower section 19 and an upper section 20 disposed above the lower section 19. The lower section 19 may be made from a rigid opaque material, such as steel or similar metal material or a plastic material, but may incorporate windows or transparent sections. The upper section 20 includes an outer stationary portion 22 or outer window and an inner movable portion 21 or inner window disposed within the outer stationary portion 22. As shown, the outer stationary portion 22 surrounds the forward and upper sides of the inner movable portion 21 and extends across and beyond the width of the lower section 19 in order to form a larger barrier to limit outside interference with the driver from unruly passengers or potential attackers. The outer stationary portion 22 may include a cut-out or shaped portion 70 that provides the driver with an unobstructed view of a side view mirror on the right side of the exterior of the bus.

The outer stationary portion 22 and the inner movable portion 21 are made from a light transmissive material, in particular, a transparent material, such as laminated glass or polycarbonate. It is to be appreciated that the outer stationary portion 22 and the inner movable portion 21 or portions thereof may be translucent rather than fully transparent. The inner movable portion 21 is movable in a vertical direction and is coupled to a lift device 25, which may be an electromechanical lift device or window regulator, disposed in the lower section 19. The lift device 25 is configured to move the inner movable portion 21 between a lowered position in which the inner movable portion 21 is at least partially withdrawn into the lower section 19 to form an opening in the upper section 20 and a raised position in which the inner movable portion 21 is extended upwardly to close the opening. The lower section 19 may incorporate controls for operating the electromechanical lift device 25 to raise and lower the inner movable portion 21, as will be discussed in additional detail below with reference to the example of FIGS. 26-35.

With reference to FIGS. 4-12, the barrier door 15 also includes a forward channel structure formed by a vertically extending extruded support beam 23 and a rearward channel structure formed by another vertically extending extruded support beam 24. The forward channel structure and the rearward channel structure extend vertically to slidably support the inner movable portion 21 between the raised and lowered positions. As shown, the forward channel structure formed by the forward support beam 23 is disposed entirely in the lower section 19 and the rearward channel structure formed by the rearward support beam 24 includes a portion disposed in the lower section 19 and another portion disposed in the upper section 20. In particular, the rearward support beam 24 forming the rearward channel structure extends the entire height of the barrier door 15 such that the rearward support beam 24 has a lower section in which the inner movable portion 21 slides and an upper section in which the outer stationary portion 22 is supported above the inner movable portion 21.

The forward and rearward support beams 23, 24 each incorporate a channel structure having three T-shaped slots. The T-shaped slots in the forward support beam 23 and in the lower section of the rearward support beam 24 have cushioning strips 26 disposed therein. The cushioning strips 26 are configured to slidably support the inner movable portion 21 within the forward and rearward support beams 23, 24. According to one example of the present disclosure, the cushioning strips 26 are formed from strips of pile lined rubber over steel. The cushioning strips 26 within the T-shaped slots create a run channel through the inner movable portion 21 slides and is supported.

Figure 7:
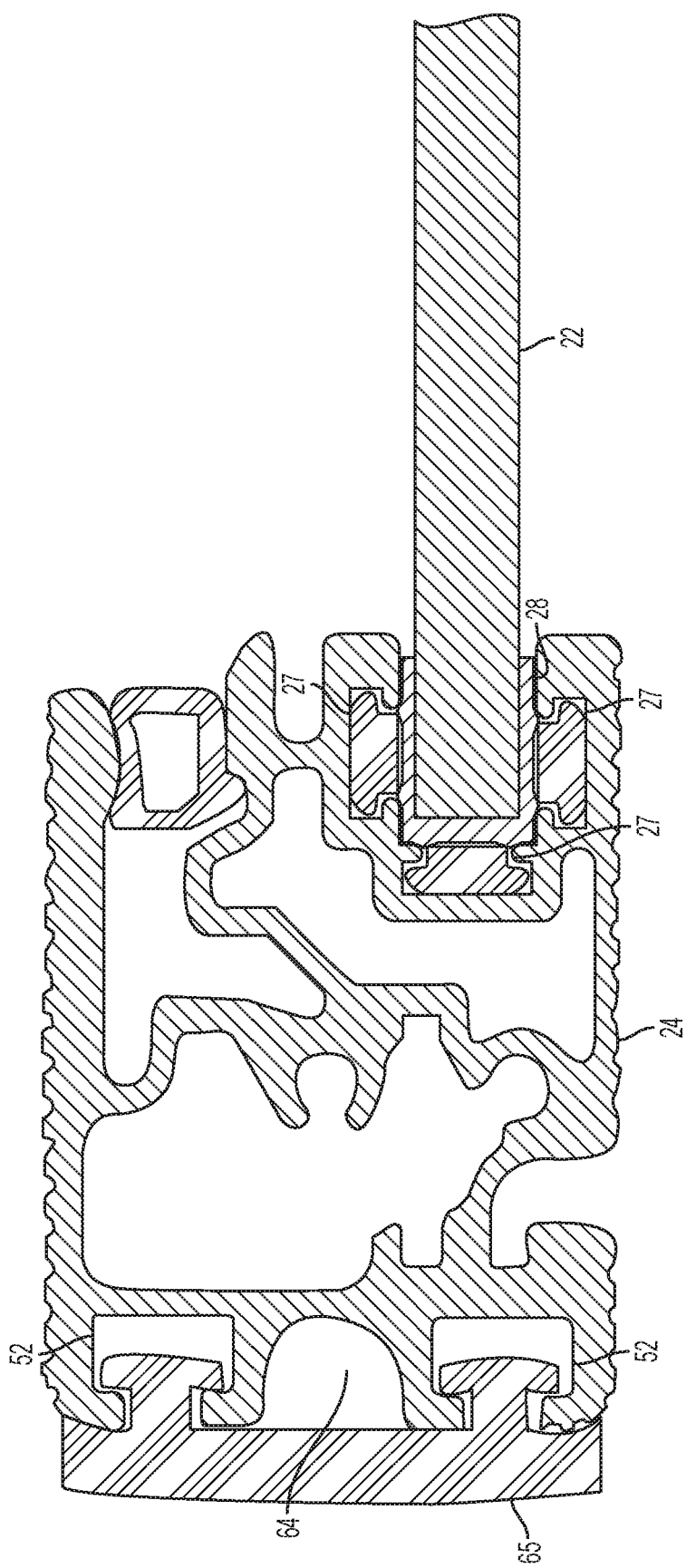
FIG. 7 is a cross-sectional view of the engagement between a rearward support beam and an outer stationary window of the barrier door of FIG. 4.
Figure 8:
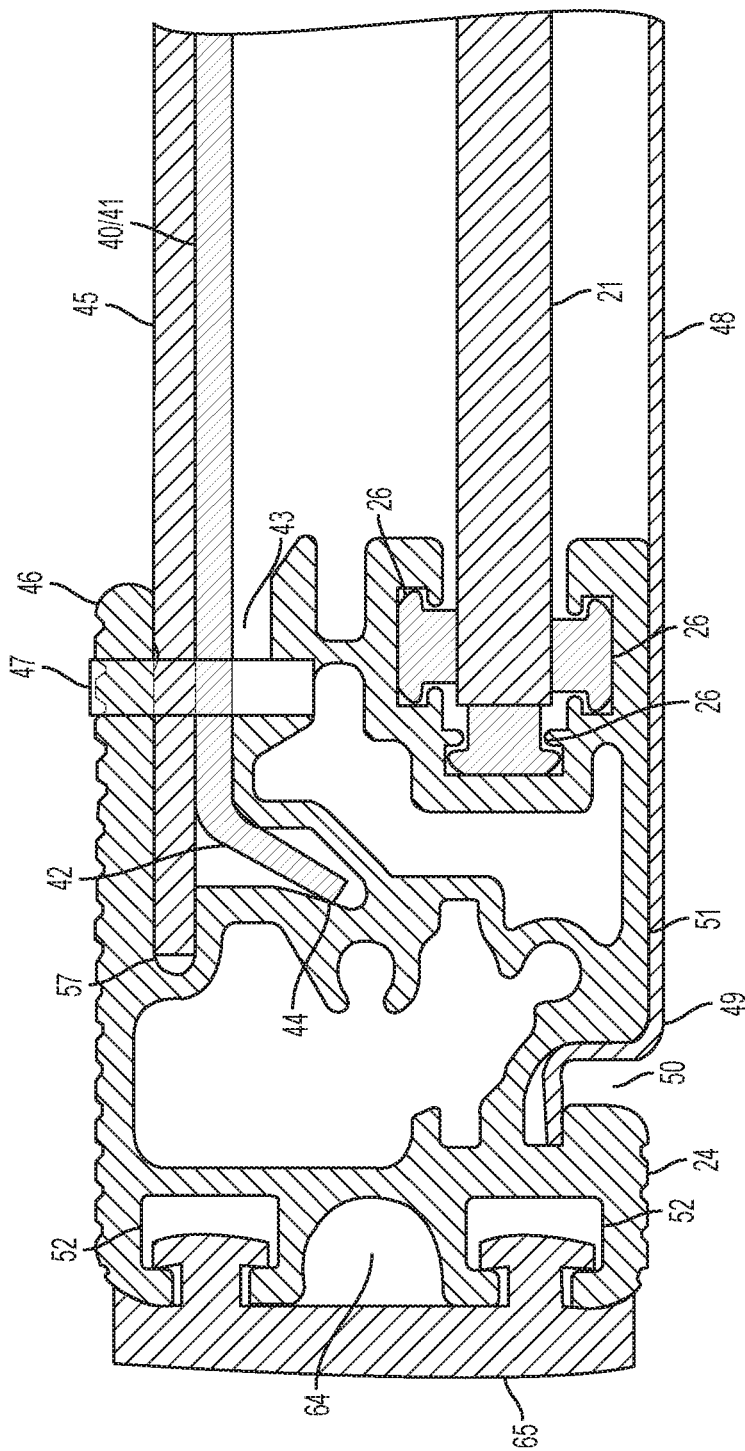
FIG. 8 is a cross-sectional view of the engagement between the rearward support beam, an inner movable window, and interior and exterior panels of the barrier door of FIG. 4.
Figure 9:
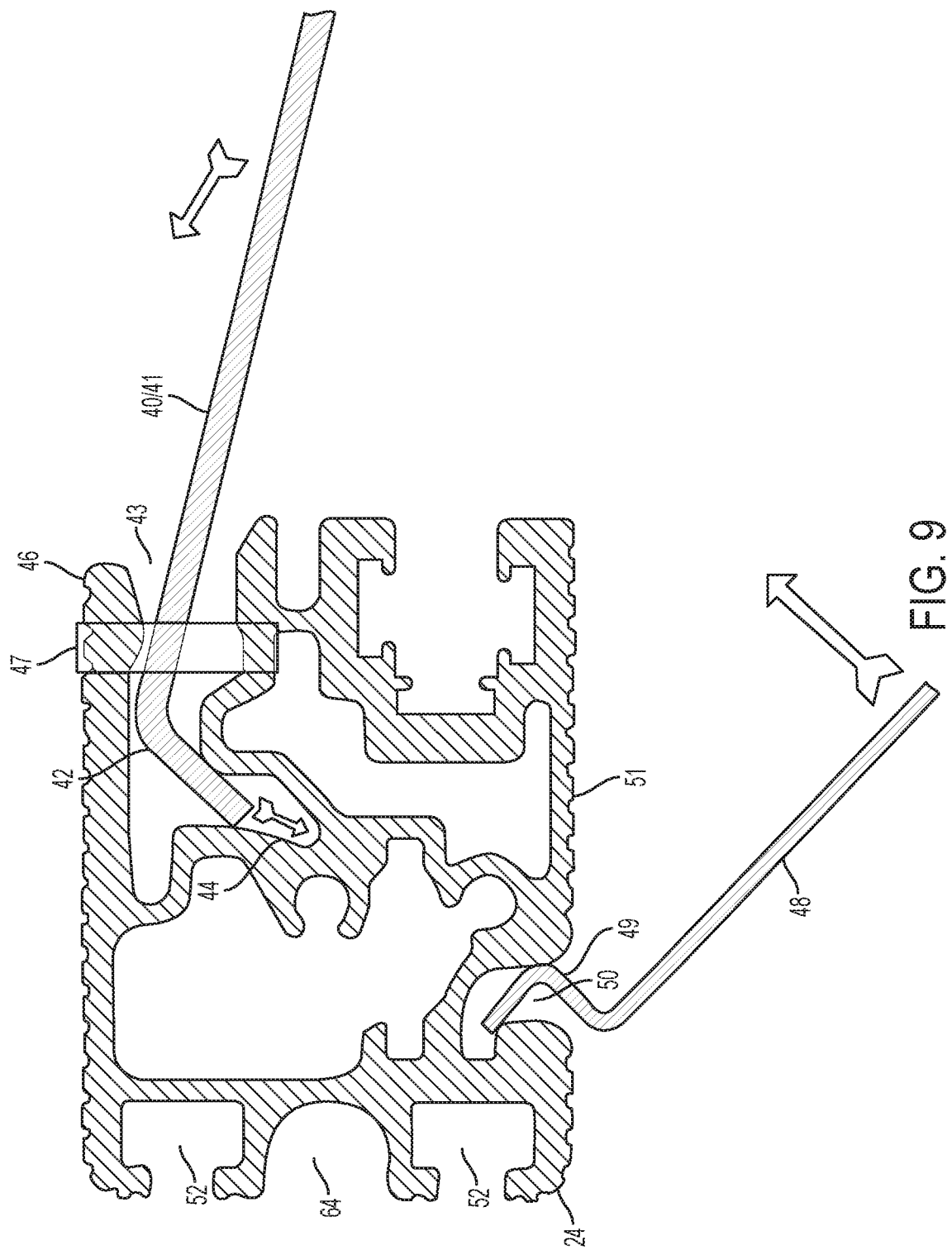
FIG. 9 is a cross-sectional view demonstrating the assembly of the interior and exterior panels on the rearward support beam of the barrier door of FIG. 4.
Figure 10:
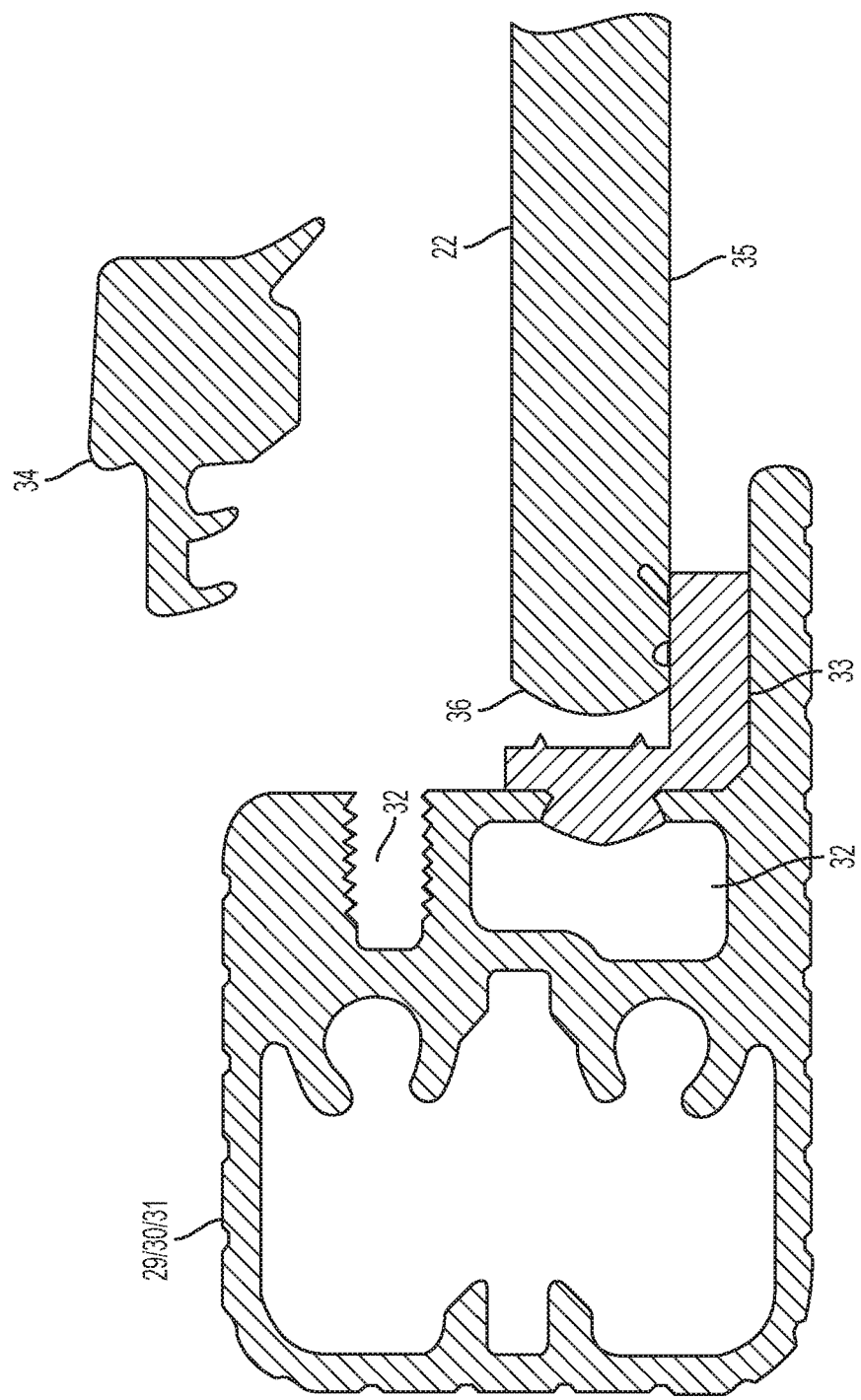
FIG. 10 is a cross-sectional view demonstrating the assembly of the outer stationary portion to securing beams of the barrier door of FIG. 4.
Figure 11:
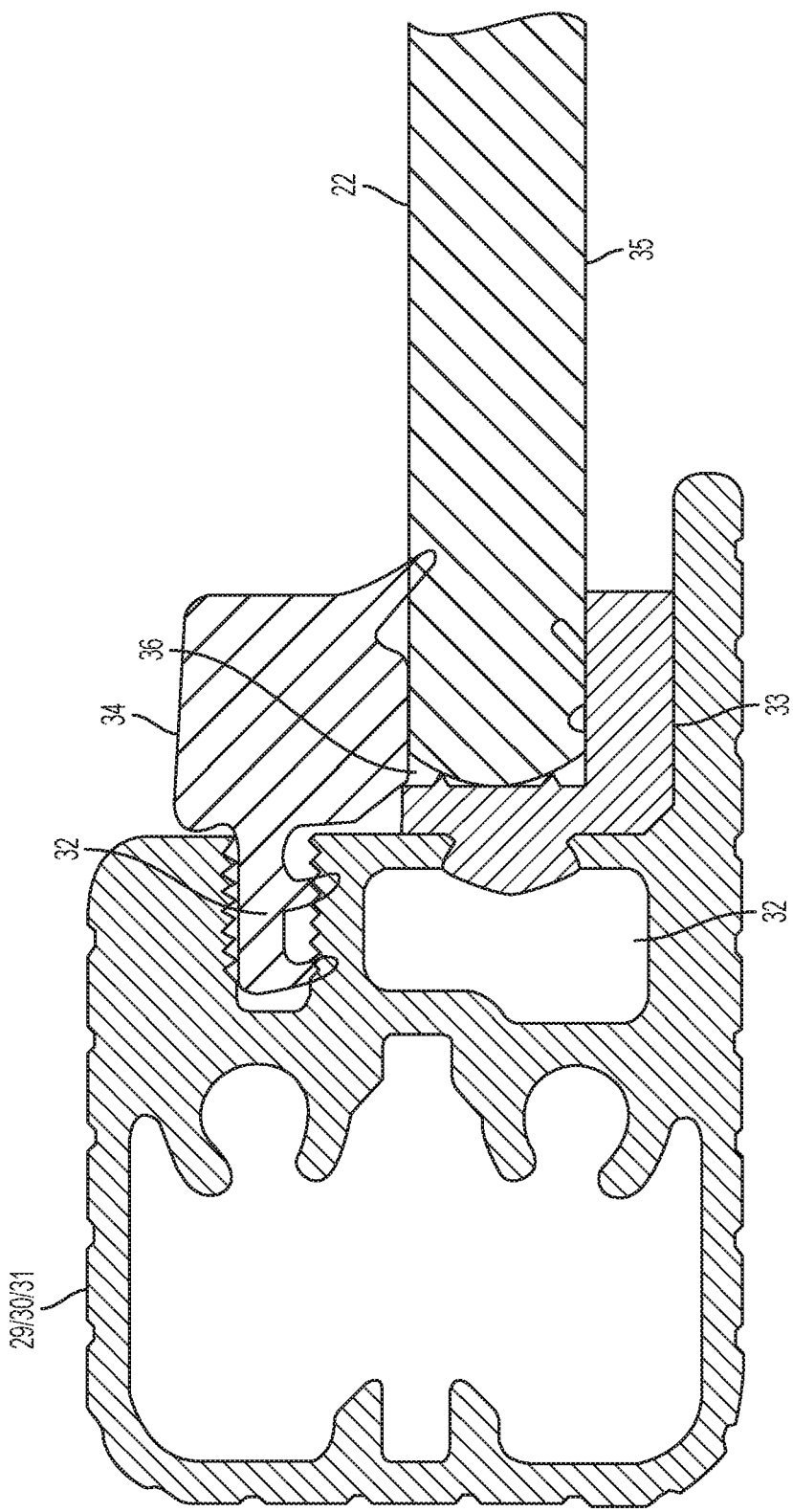
FIG. 11 is a cross-sectional view of the engagement between the outer stationary portion and the securing beams of the barrier door of FIG. 4.
Figure 12:
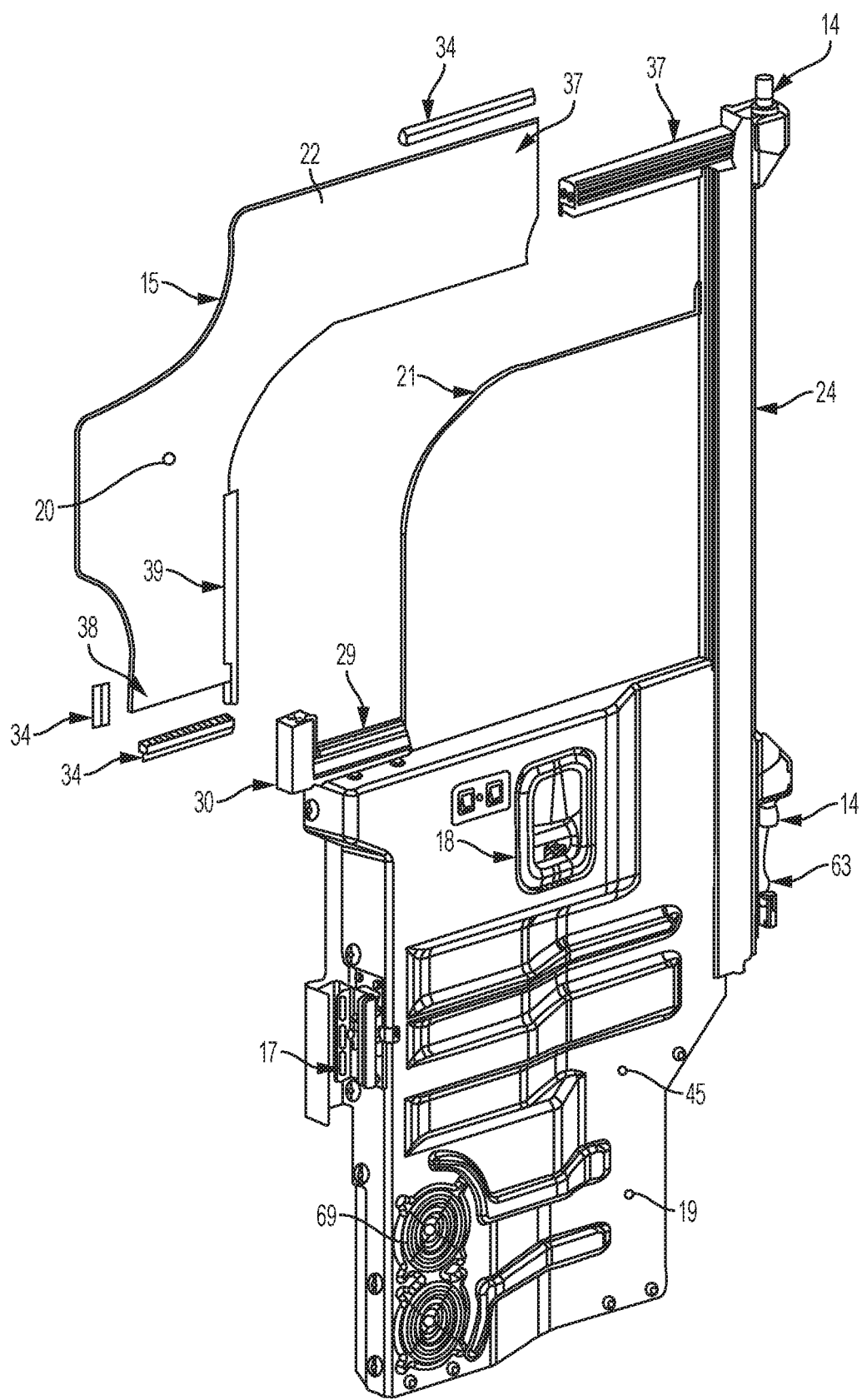
FIG. 12 is an interior side perspective view of the barrier door of FIG. 4 with the upper section exploded.
Figure 13:
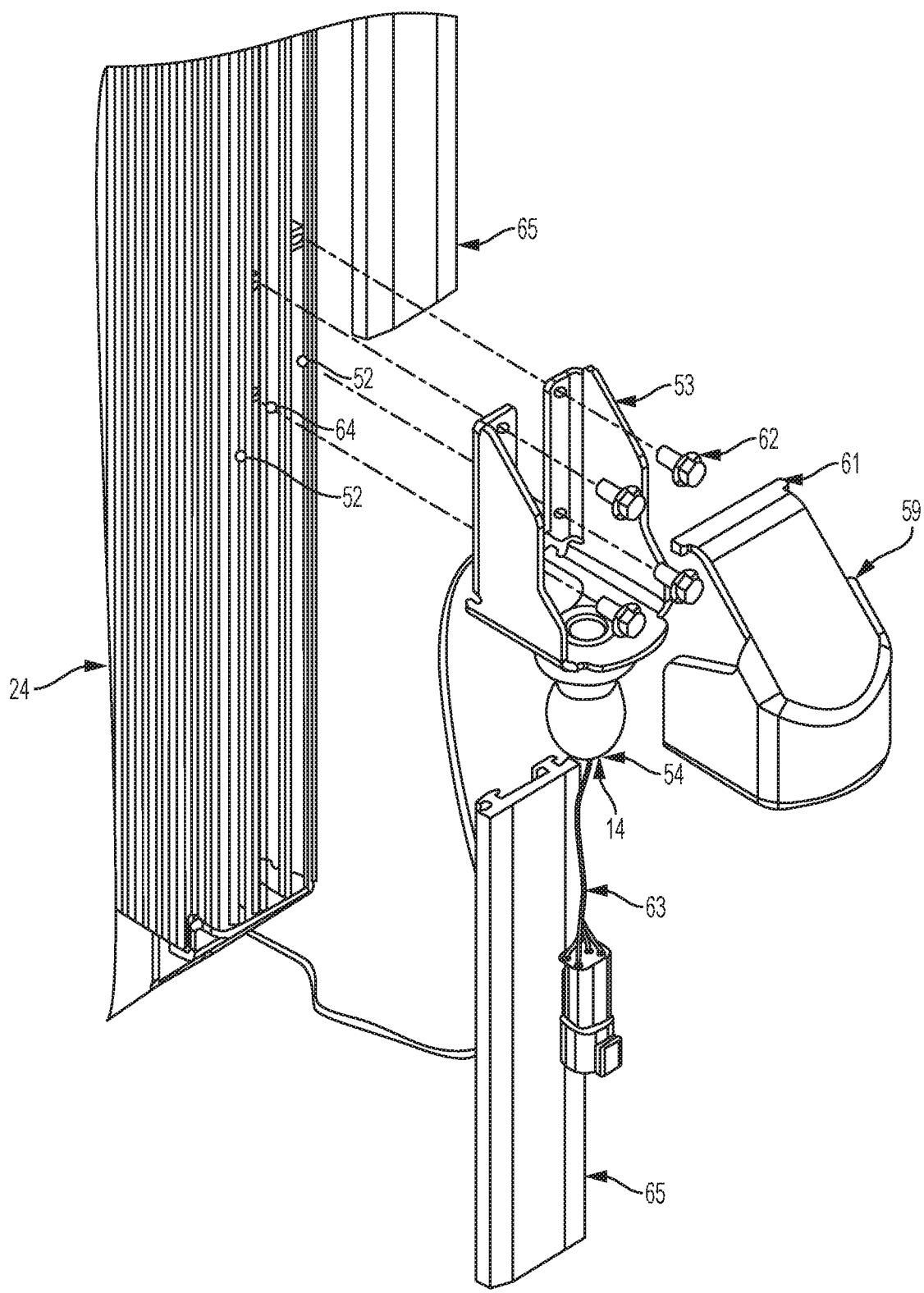
FIG. 13 is an exploded perspective view of the hinge structure of the barrier door of FIG. 4.
Figure 14:
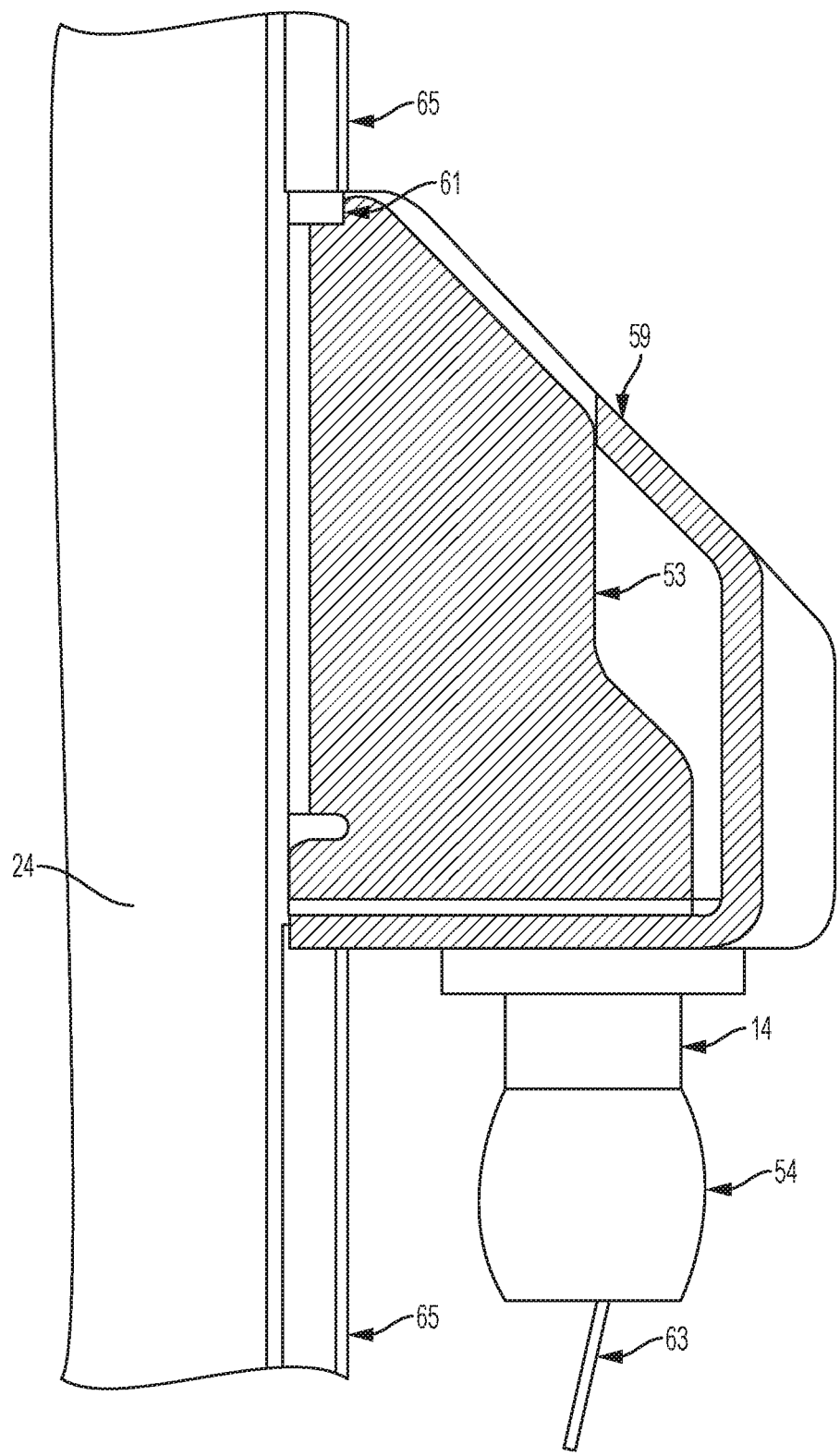
FIG. 14 is a cross-sectional view of the hinge structure of FIG. 13.
Figure 15:
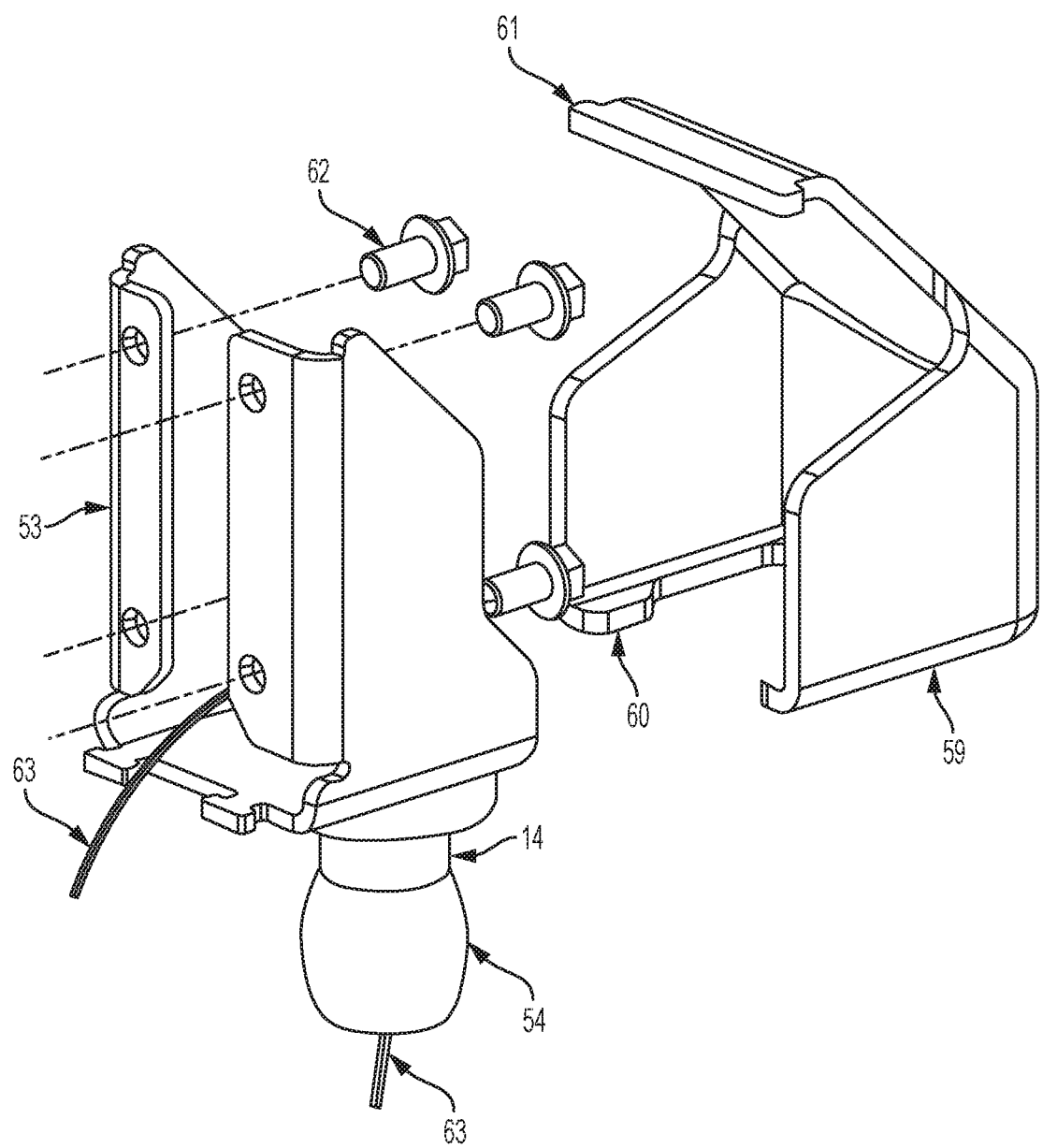
FIG. 15 is another exploded perspective view of the hinge structure of FIG. 13.

As shown in FIG. 7, the T-shaped slots in the upper section of the outer stationary portion 22 may include filler plugs 27 placed therein. The outer edge of the outer stationary portion 22 may be wrapped with standard rubber setting tape 28, lubricated with standard glass setting lubricant and inserted into the channel defined by the filler plugs 27 such that the filler plugs 27 and setting tape 28 support the outer stationary portion 22 within the rearward support beam 24. The setting tape 28 cushions the edge of the outer stationary portion 22 and provides some retention force to the outer stationary portion 22.

With reference to FIGS. 4-6 and 10-12, the upper section 20 includes a plurality of extruded beams 29, 30, 31 that mount and retain the outer stationary portion 22 on the lower section 19. Two of the beams 29, 30 are affixed together using extruded screw receptacles to form a corner at the forward side of the barrier door 15 and secured to a location on the upper section 20 forward of the inner movable portion 21. The corner formed by the two beams 29, 30 is configured to hold a lower, forward corner 38 of the outer stationary portion 22. Another horizontal extruded beam 31 is affixed in a pocket near the top of the rearward support beam 24 and cooperates with the rearward support beam 24 to form a second corner at the rearward side of the barrier door 15 opposite to the first corner. The corner formed by the beam 31 and the rearward support beam 24 holds an upper, rearward corner 37 of the outer stationary portion 22. The three beams 29, 30, 31 each define channels 32 that receive and retain retention flanges of an outer clip 33 and an inner clip 34 of two extruded elastomer pieces. The inner clip 34 and the outer clip 33 hold the outer stationary portion 22 therebetween. The outer clip 33 sits in a corner formed by the body and an outer flange of the beam 29, 30, 31 to act as a cushion between the extruded beam 29, 30, 31 and both an outer face 35 of the outer stationary portion 22 and an outer edge 36 of the outer stationary portion 22. The outer stationary portion 22, once inserted into the channel of the rearward support beam 22, is positioned to be enclosed at its opposing corners 37, 38 by the outer clips 33. The inner clips 34 are then inserted into the corresponding channels 32. The inner clips 34 may be configured to create a pinching retention force on the outer stationary portion 22 to hold the outer stationary portion 22 in position. Accordingly, the outer stationary portion 22 can be mounted on the assembly of the door 15 without the need for adhesives, or for holes or notches to be formed in the outer stationary portion 22, which might weaken its structural integrity. In the event that the outer stationary portion 22 is damaged, such as through vandalism, the configuration of the inner and outer clips 34, 33 in the beams 29, 30, 31 allows for easy replacement of the outer stationary portion 22 without the need for special tooling.

The outer stationary portion 22 includes a channel 39 made from a light transmissive material, such as a clear plastic, installed along an inner vertical wall that acts as a guide and support to the forward edge of the inner movable portion 21 as it extends above the forward support beam 23.

With reference to FIGS. 4-6, 8, 9, and 12, the lower section 19 of the barrier door 15 includes an interior panel 45 defining an interior side of the lower section 19 and an exterior panel 48 defining an exterior side of the lower section. The rearward support beam 24 has multiple channels that act as receptacles for the structural and close-out panels of the lower section 19 of the barrier door 15. Internal skeletal braces 40, 41 incorporate angled flanges 42 at the ends, which can be installed on a respective channel of the forward support beam 23 and the rearward support beam 24 by being inserted into a receiving channel 43 formed in each of the forward and rearward support beams 23, 24. The opening of the receiving channel 43 is wider than the thickness of the skeletal braces 40, 41, allowing the tips of the flanges 42 to be oriented and then inserted into slots 44 inside the interior of the channels 43. The angled flange 42 is under-bent such that when the skeletal brace 40, 41 is rotated into the final installed position, the tip of the angled flange 42 provides a positive retention force to hold the skeletal brace 40, 41 in position against vibration and to prevent rattle. The interior panel 45 or flat insert, which may be made from a plastic material, is later inserted into the receiving channel 43. The interior panel 45 is pinched against the skeletal braces 40, 41 by the spring force of an outer flange 46 of the respective support beam 23, 24 to further secure the skeletal braces 40, 41 in the channel 43 and prevents the tip of the angled flange 42 from backing out of the inner slot 44. Slots in the skeletal braces 40, 41 pass over fixed pins 47 in the respective support beam 23, 24 that secure the vertical position of the skeletal braces 40, 41. A similar mounting arrangement may be used to secure the skeletal braces 40, 41 to the forward support beam 23 with a flat insert (not shown) provided in place of the interior panel 45.

The interior panel 45 provides a cosmetic close-out to the inner face of the lower section 19 of the barrier door 15. The panel 45 provides a finished appearance to the barrier door 15 and acts as a barrier to protect foreign objects, such as the driver's fingers, clothing, tools, etc., from entering and damaging or being damaged by the internal mechanisms of the barrier door 15. The interior panel 45 incorporates a plurality of quick release fasteners 56 commonly used in the automotive industry to allow the interior panel 45 to be removed easily if service, repairs, or replacement are required. The rearward flange of the interior panel 45 is secured by inserting the flange into the receiving channel 43 that also receives the skeletal braces 40, 41. A receiving slot 57 formed within the receiving channel 43 acts to secure the interior panel 45 while the spring forces from the outer flange 46 of the rearward support beam 24 will pinch the interior panel 45 against the skeletal braces 40, 41 to both prevent rattling of the interior panel 45 and further secure the position of the skeletal braces 40, 41. The frictional forces and the quick release fasteners 56 ensure that the interior panel 45 does not come out of the receiving slot 57 during operation. The interior panel 45 incorporates cutouts 58 which slide over the pins 47 in the rearward support beam 24 to provide vertical positioning of the interior panel 45.

Figure 16:
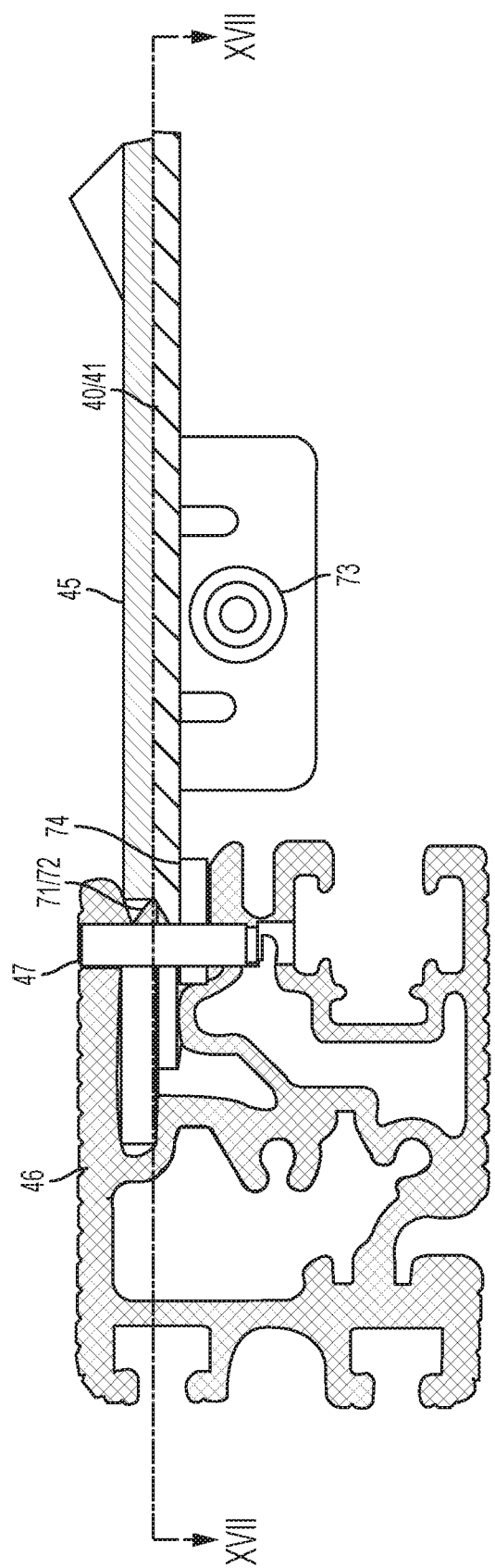
FIG. 16 is a cross-sectional view taken along lines XVI-XVI shown in FIG. 17 of the engagement between the inner side panel and the rearward support beam of the barrier door of FIG. 4 according to an alternative example of the present disclosure.
Figure 17:
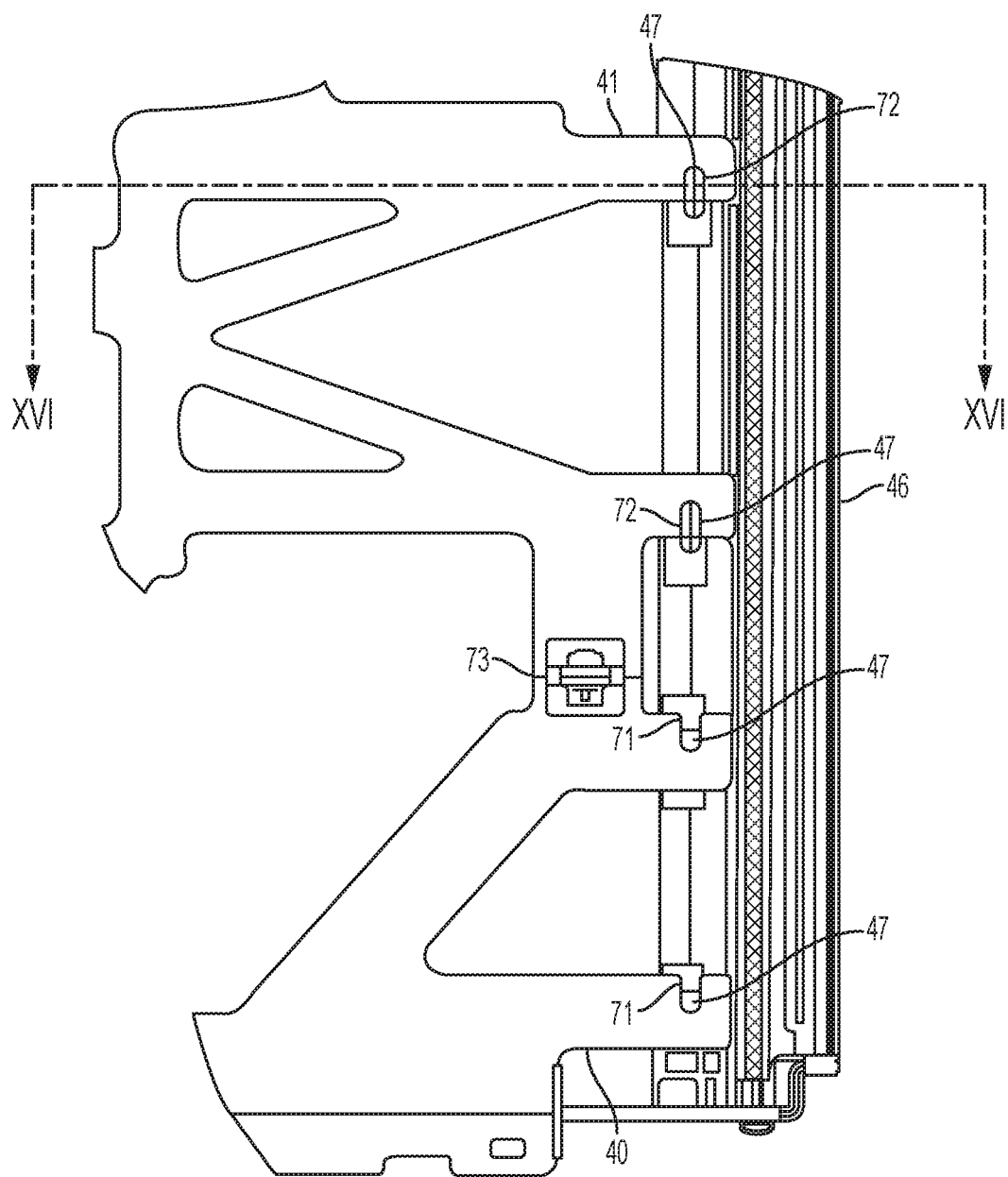
FIG. 17 is a cross-sectional view taken along lines XVII-XVII shown in FIG. 16 of the engagement between skeletal braces and the rearward support beam and the barrier door of FIG. 4 according to the alternative example of the present disclosure.

With reference to FIGS. 16 and 17, according to an alternative example of the present disclosure, the internal skeletal braces 40, 41 have straight ends with hook openings 71, 72 formed at the ends thereof such that, when inserted into the receiving channels 43 in the forward and rearward support beams 23, 24, the hook openings 71, 72 pass over and engage the fixed pins 47. Because the resulting forces supporting the skeletal braces 40, 41 are mostly horizontal, most of the support force bears across the hook openings 71, 72 into the fixed pins 47. The upper skeletal brace 41 may have two hook openings 72 in a generally downward orientation such that a lower portion of the brace 41 stabilizes the connection to the forward or rearward support beam 23, 24 and allows the skeletal brace 41 to be installed first and not move while the remaining retention devices are installed. The lower skeletal brace 40 may also have hook openings 71 that are generally facing downward for the same reason. However, the lower skeletal brace may instead be provided with upward facing hook openings 72, as shown, such that the lower skeletal brace 40 can be installed and secured against the upper skeletal brace 41 with a bolted flange 73 or similar joint, thus locking the two skeletal braces 40, 41 together and preventing the hook openings 71, 72 from disengaging the pins 47. The hooked openings 71, 72 may be tapered to provide a tighter retention of the pins 47.

As discussed above with respect to the example of FIGS. 8 and 9, the interior panel 45 or a flat insert is inserted in the receiving channel 43 along with the skeletal braces 40, 41 to prevent rattling. An additional pad 74 made from a vibration absorbing material may be inserted into the opposite side of the receiving channel 43 to further prevent vibration. The hook openings 71, 72 and the bolted flange 73 are sufficient to retain the skeletal braces 40, 41 on the forward and rearward support beams 23, 24. Accordingly, the interior panel 45 may be installed in a separate channel formed in the forward and rearward support beams 23, 24.

With reference to FIGS. 4-6, 8, 9, and 12, the exterior panel 48 of the lower section 19 of the barrier door 15 includes an S-curved end 49 along the rear edge that allows the exterior panel 48 to be inserted at an angle into a L-shaped groove 50 and then rotated to an installed position to lay against an outer face 51 of the rearward support beam 24. The tip of the curved end 49 is over-bent such that, when the exterior panel 48 is rotated to the installed position, the tip of the curved end 49 provides a positive retention force to secure the exterior panel 48 in position against vibration and to prevent rattling. Fasteners are provided to secure the forward end of the exterior panel 48 and to maintain the tension of the rearward joint. A fastener in the base of the exterior panel 48 as well as the frictional forces from the tip of the curved end 49 disposed within the groove 50 provides vertical support and positioning of the exterior panel 48.

With reference to FIGS. 3-9 and 12-15, the rearward support beam 24 incorporates a set of T-shaped slots 52 on the rearward side thereof that permit mounting, using T-shaped nuts or similar fasteners, of upper and lower adjustable brackets 53 of the hinge structure 14 on the rearward side of the support beam 24. Each bracket 53 incorporates a spherical hinge pin 54 which interfaces with a fixed position flange bushing on a respective one of a set of mounting brackets 55, which are fixed to the rear screen 11 or another part of the vehicle's structure. The spherical hinge pins 54 are able to adapt to slight misalignments between the upper and lower adjustable brackets 53 while the flange face of the lower spherical hinge pin 54 provides vertical support for the barrier door 15. Mounting the adjustable brackets 53 to the T-shaped slots 52 on the rearward support beam 24 allows for adjustment of the vertical position of the barrier door 15 and the spacing between the hinge pins 54 to be simplified. The T-shaped slots 52 may be structured or arranged to prevent slippage of the brackets 53 under vibration. The T-shaped slots 52 may also be provided on the forward support beam 23 to mount some additional internal structure of the barrier door 15.

The hinge structure 14 also includes formed plastic covers 59 that slide over the adjustable brackets 53. The covers 59 include flanges 60 that engage the pin side over the adjustable brackets 53 and tabs 61 that slide over mating tabs in the adjustable brackets 53 to provide a tamper-resistant structure for closing out the hinge structure 14 that does not require tools to install. The covers 59 allow access to mounting screws 62 for the adjustable brackets 53 and to a wiring harness 63 passing through the hinge structure 14. A central channel 64 is built into the rearward support beam 24 between the T-shaped slots 52 through which the electrical cabling of the wiring harness 63 can be routed. By placing the channel 64 on the exterior face of the rearward support beam 24, the cable of the wiring harness 63 can be routed without having to run it through a hole in the rearward support beam 24, thus making assembly easier. A rubber finishing cap 65 may be provided on the rear face of the support beam 24 above and below the adjustable brackets 53. The finishing cap 65 includes features configured to engage the T-shaped slots 52. The finishing cap 65 provides a clean cosmetic appearance and a protective cover for the channel 64 accommodating the wiring harness 63. As shown in FIGS. 12-15, the wiring harness 63 passes out of the rear screen 11 and into the interior of the lower section 19 of the barrier door 15 via the lower spherical hinge pin 54 and adjustable bracket 53 and into the channel 64 of the rearward support beam 24. It is to be appreciated that the wiring harness 63 may alternatively be passed through the upper spherical hinge pin 54 and adjustable bracket 53.

With reference to FIGS. 18-25, a driver's protective enclosure 100 for a transit vehicle is shown in accordance with another example of the present disclosure. As shown, the protective enclosure 100 is located in the front left portion of the vehicle (e.g., a bus). It is to be understood that other locations for the driver's protective enclosure 100 are possible. A rear screen 101 is located directly behind the driver's position within the protective enclosure 100 to provide a separation between the rear of the driver's protective enclosure 100 and the passenger section of the vehicle. The rear screen 101 may be completely non-transparent, or it may incorporate windows or other transparent features therein. Adjacent to the driver's protective enclosure 100 may be a fare box 102, which enables passengers to pay fares while entering and exiting the vehicle.

Coupled to the rear screen 101 is a barrier door 107. The barrier door 107 is configured to rotate about a hinge structure 105 which runs vertically between respective mounting points along an edge of the rear screen 101. The barrier door 107 is placed at a sufficient distance from the entrance of the vehicle and a right wheel well 103 to allow for unhindered access to the vehicle for passengers, including those in wheelchairs. The barrier door 107 may also be positioned above a floor level 104 so as to provide such adequate clearance. However, in alternative configurations, the barrier door 107 may reach entirely to the floor level 104. Additionally, while the barrier door 107 provides adequate clearance for passengers, it is also positioned at an adequate distance away from the driver's position so as to comfortably provide the driver with access to all controls in the driver's protective enclosure 100.

As noted above, the barrier door 107 is configured to be coupled to an edge of the rear screen 101 via the hinge structure 105. The barrier door 107 may be configured so as to rotate through the aisle (i.e., outward toward the passenger entrance) to be stowed against a left wheel well 106 located behind the rear screen 101. However, alternative methods of coupling and/or stowing the barrier door 107, such as a sliding mechanism or forward swinging door, are also possible.

Figure 18:
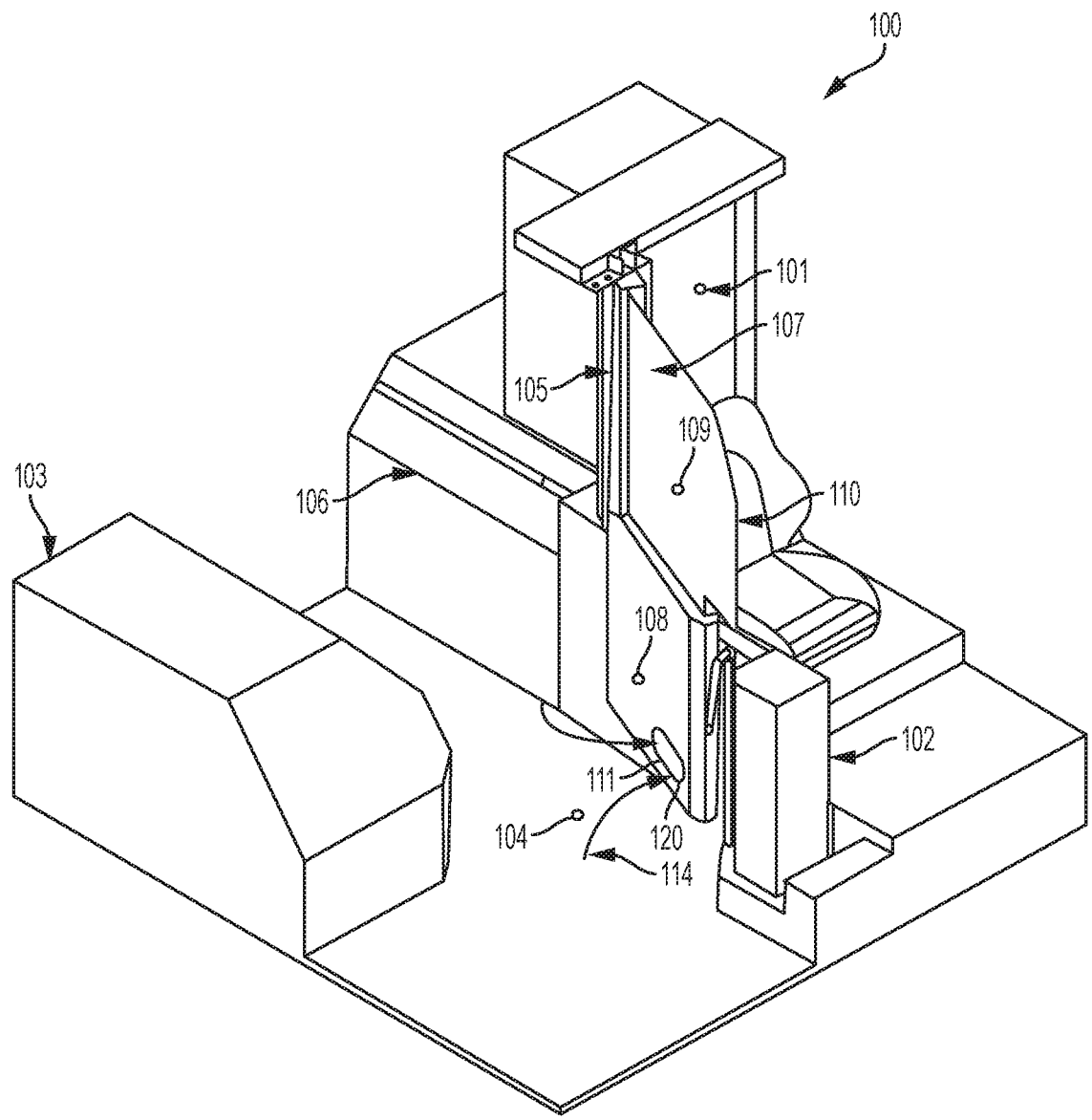
FIG. 18 is an exterior perspective view of a driver's protective enclosure having a barrier door according to another example of the present disclosure.
Figure 19:
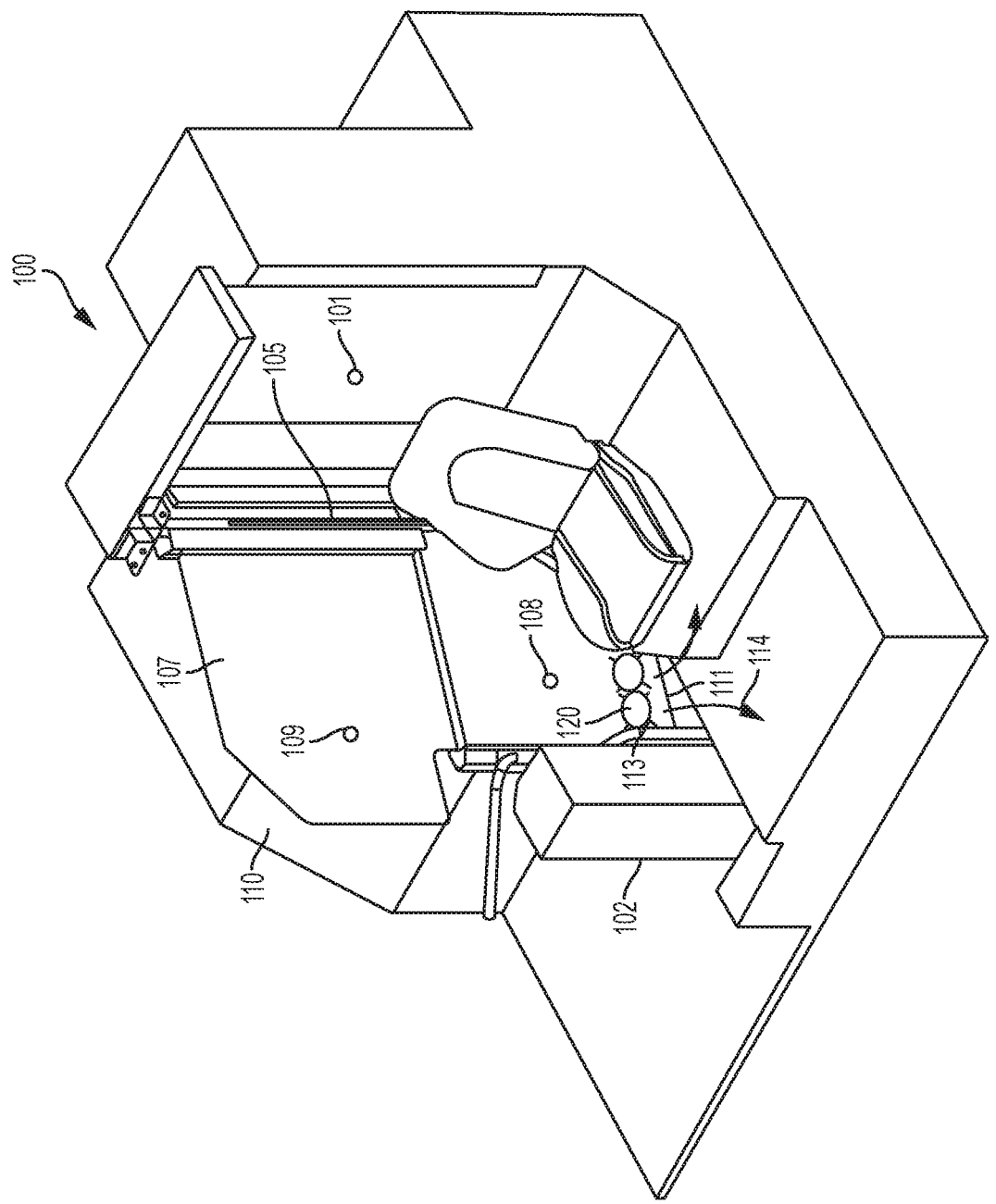
FIG. 19 is an interior perspective view of the driver's protective enclosure of FIG. 18.
Figure 20:
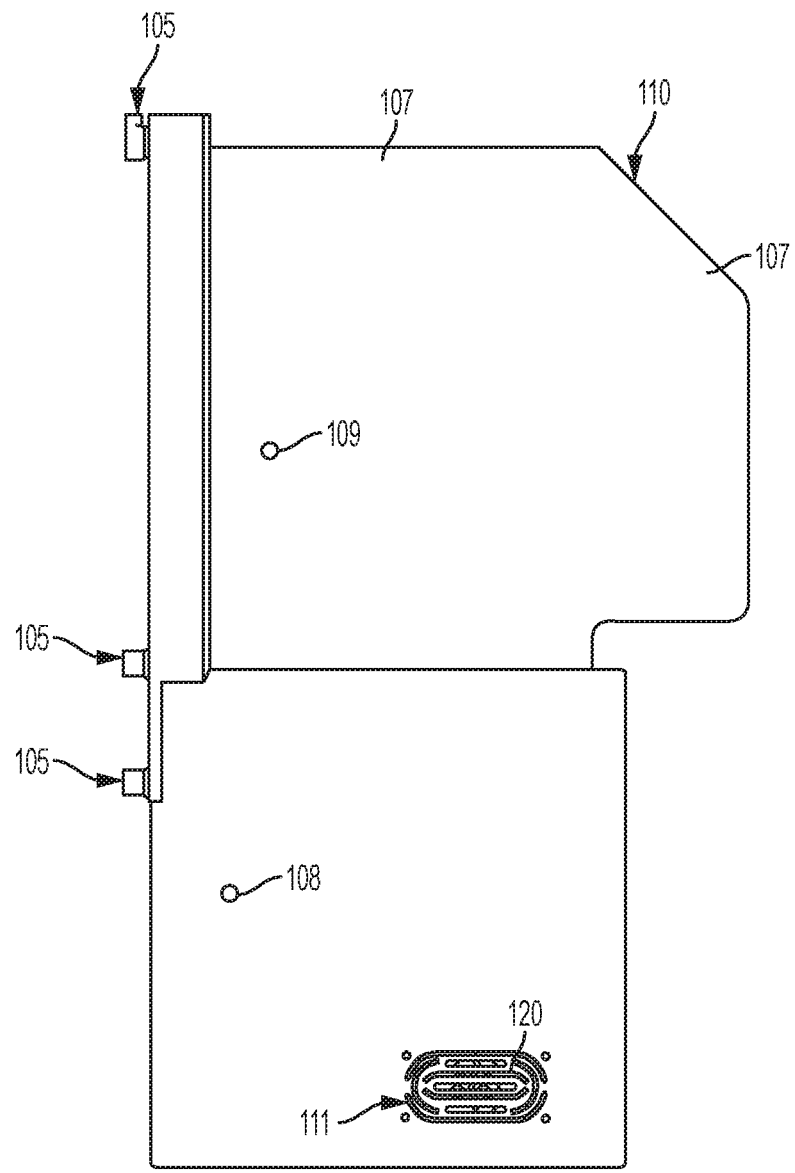
FIG. 20 is an exterior side view of the barrier door of the driver's protective enclosure of FIG. 18.

As shown in FIGS. 18-20, the barrier door 107 includes a lower section 108 and an upper section 109. The lower section 108 may be made from a rigid, non-transparent material, such as steel or similar metal material or a plastic material. The lower section 108 may also incorporate additional windows or transparent sections as found to be suitable. The upper section 109 is formed from a light transmissive material. In particular, the upper section 109 may be formed from a transparent material, such as laminated glass, acrylic, polycarbonate, etc. A portion of the upper section 109 may be retractable into the lower section 108, as discussed above with reference to the example of FIGS. 1-17. Additionally, the lower section 108 and the upper section 109 may be separately pivotable from one another along the hinge structure 105 to form a "dutch door" configuration. Alternatively, the lower section 108 and the upper section 109 may be permanently fixed together. The upper section 109 may include movable panels to partially open the barrier door 107, a pass-through or cut-outs for communication with passengers and/or ventilation, or a variety of other configurations.

The upper section 109 of the barrier door 107 is configured to extend at least partially over the fare box 102, but does not necessarily extend so far as to connect with or engage the windshield at the front of the vehicle. The upper section 109 also does not necessarily extend to the ceiling of the vehicle. In this way, the upper section 109 allows air to pass around the edges of the barrier door 107 to promote air circulation through the driver's protective enclosure 100. A cut-out 110 may also be incorporated in the upper section 109 to provide the driver with an unobstructed view of the rear and side view mirrors of the vehicle. While such incomplete extension does leave portions of the driver's protective enclosure 100 open to the passenger area of the vehicle, the overall enclosure 100 generally extends far enough around the driver's position to provide adequate protection to the driver.

As shown in FIGS. 18-22, the lower section 108 includes a ventilation system 120 therein. The ventilation system 120 includes one or more electric blowers 111 in a plenum 112 located in a region 113 of the lower section 108. The one or more electric blowers 111 are configured to create an air flow 114 into or out of the driver's protective enclosure 100 to provide for increased ventilation and driver comfort. The electrical wiring for the one or more electric blowers 111 may be routed into the barrier door 107 via any known method for providing electrical power within a hinged door. Particularly, the wiring may be routed into the lower section 108 via the hinge structure 105 in the same manner as discussed above with reference to the example of FIGS. 1-17. Additionally, the electrical wiring to power and/or control the one more electric blowers 111 may be utilized to power other devices and accessories within the lower section 108 of the barrier door 107, such as the electromechanical lift device for a powered, movable window panel. The controls for the one or more electrical blowers 111 may be located on the barrier door 107 or at a location remote from the barrier door 107.

According to one example of the present disclosure, the one or more electric blowers 111 of the ventilation system 120 may be configured to create a flow of air 114 into or out of the driver's protective enclosure 100. If two or more electric blowers 111 are utilized in the ventilation system 120, both blowers 111 could be configured to create an air flow 114 in the same direction either into or out of the driver's protective enclosure 100. Alternatively, the two electric blowers 111 could be configured to each create an air flow in opposite directions, thereby enabling the driver to control the desired direction of the air flow based upon specific conditions within the driver's protective enclosure 100. For example, the operator could choose to create an air flow 114 into the protective enclosure 100 using a first electric blower 111 under a first condition, and create an airflow 114 out of the protective enclosure 100 using a second electric blower 111 under a second condition.

As shown in FIG. 21, the ventilation system 120 may additionally be configured to create an upward air flow 115 through the barrier door 107. The plenum 112 in the lower section 108 may be configured with a radial electric blower capable of creating the upward air flow 115 through the interior of the lower section 108 and across the driver's side of the upper section 109. The air flow 115 may be directed through the lower section 108 using one or more baffles or channels located in the lower section 108. Furthermore, a mechanical damper could be incorporated into the lower section 108 to enable the driver to control the air flow 115. According to this example, the upward air flow 115 blows along the upper section 109, as opposed to directly on the driver, which may prevent an undesirable draft on the driver. Additionally, the air flow 115 blowing upward along the upper section 109 may act to reduce fogging of a transparent upper section 109 under certain temperature conditions, such as a rush of warm, humid air into an air conditioned vehicle when the passenger doors are opened. As such, the driver's visibility through the upper section 109 is not compromised.

As discussed above, the ventilation system 69 of the barrier door 15 discussed above with reference to the example of FIGS. 1-17 may be of the same or similar construction and configuration as the ventilation system 120 of the barrier door according to the example of FIGS. 18-22.

Figure 23:
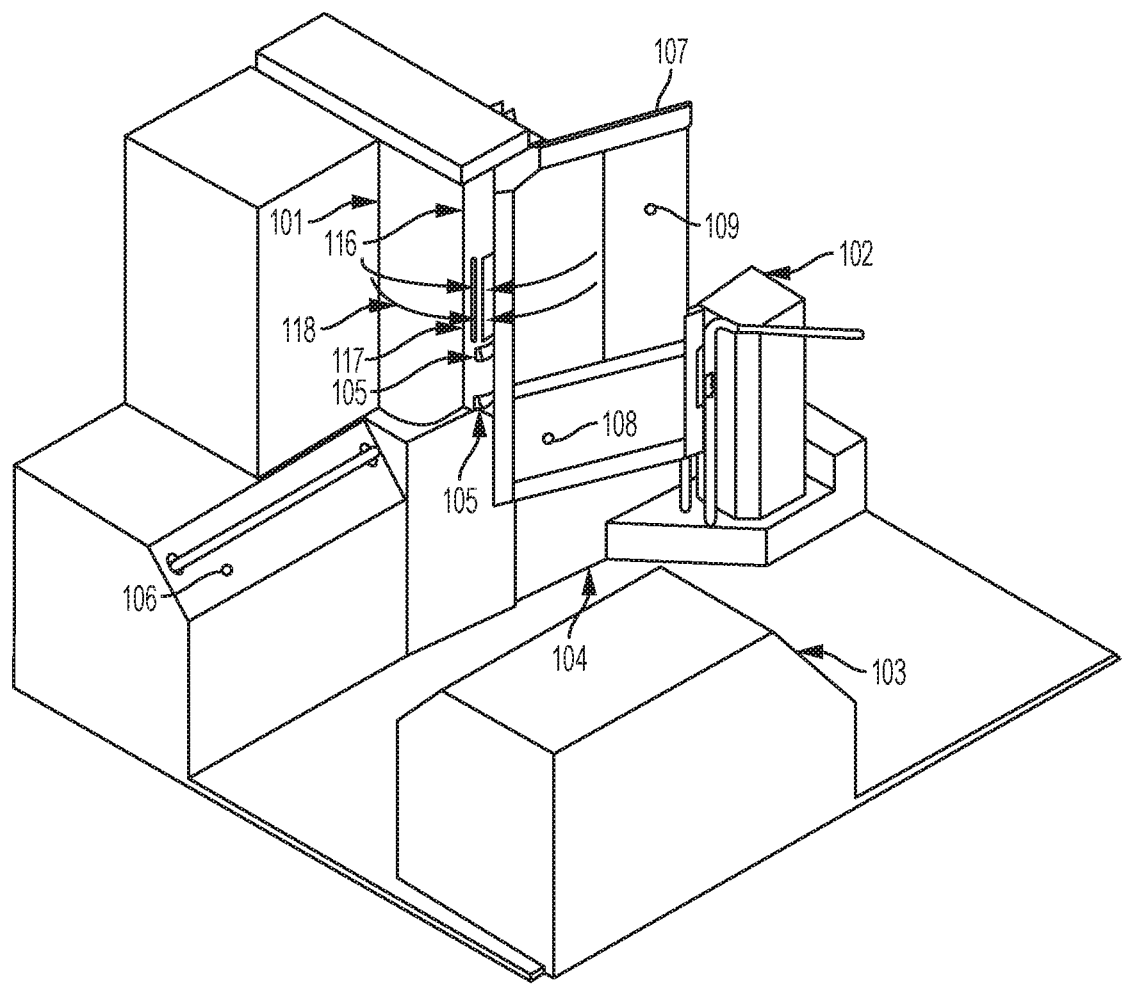
FIG. 23 is an exterior perspective view of the driver's protective enclosure of FIG. 18 according to an alternative example of the present disclosure.
Figure 24:
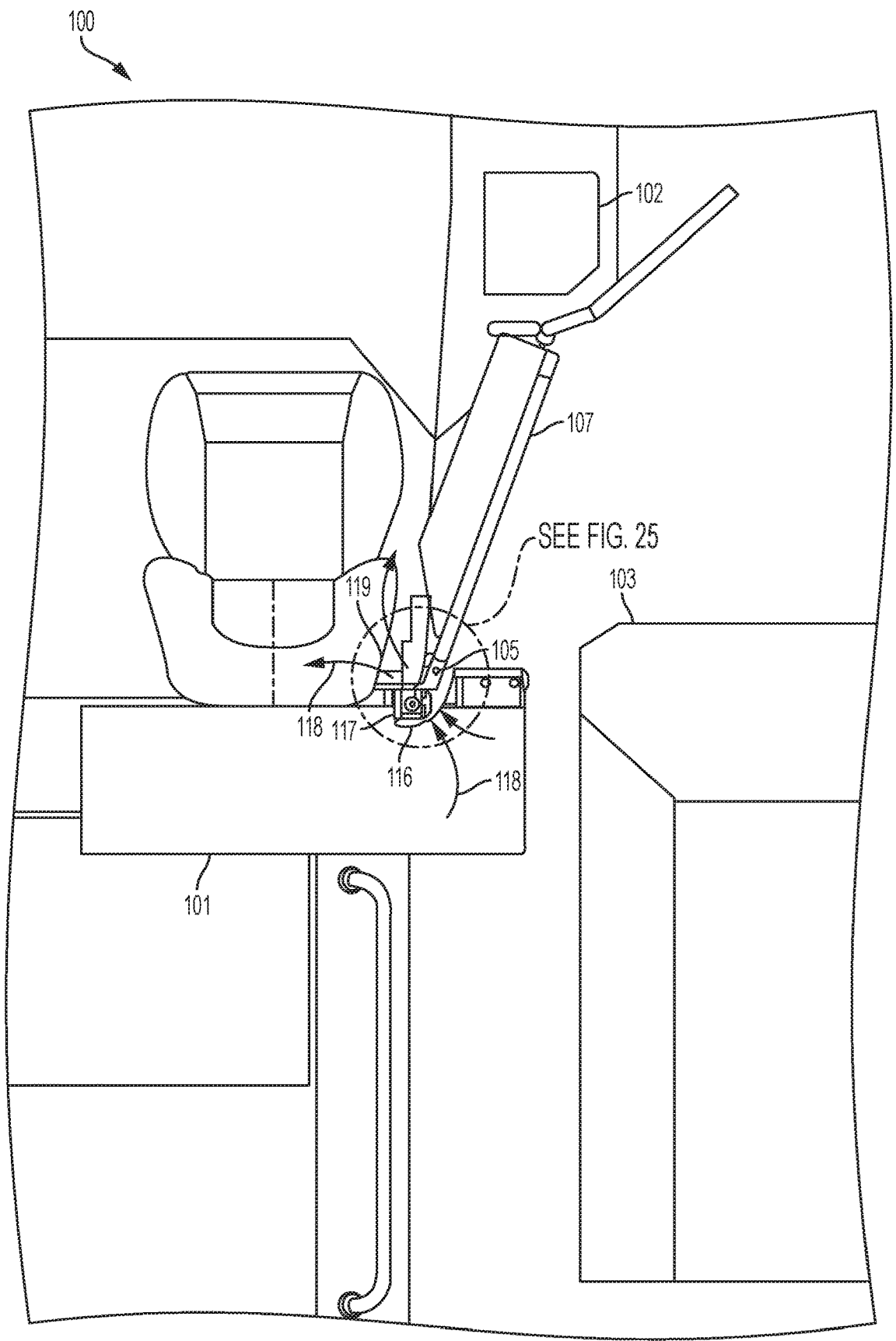
FIG. 24 is a top view of the driver's protective enclosure of FIG. 23.
Figure 25:
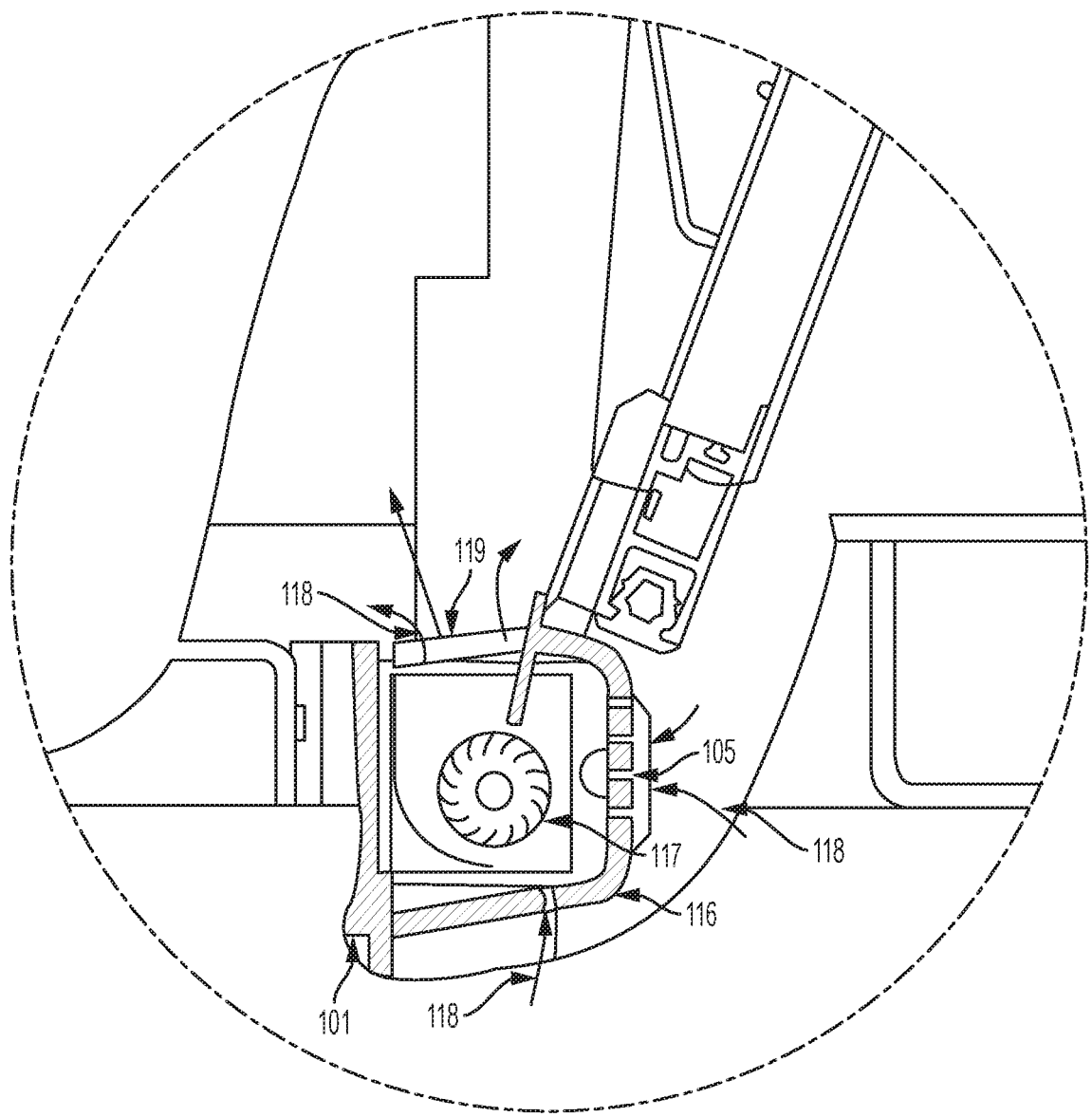
FIG. 25 is an enlarged view of area XXV shown in FIG. 24.
Figure 26:
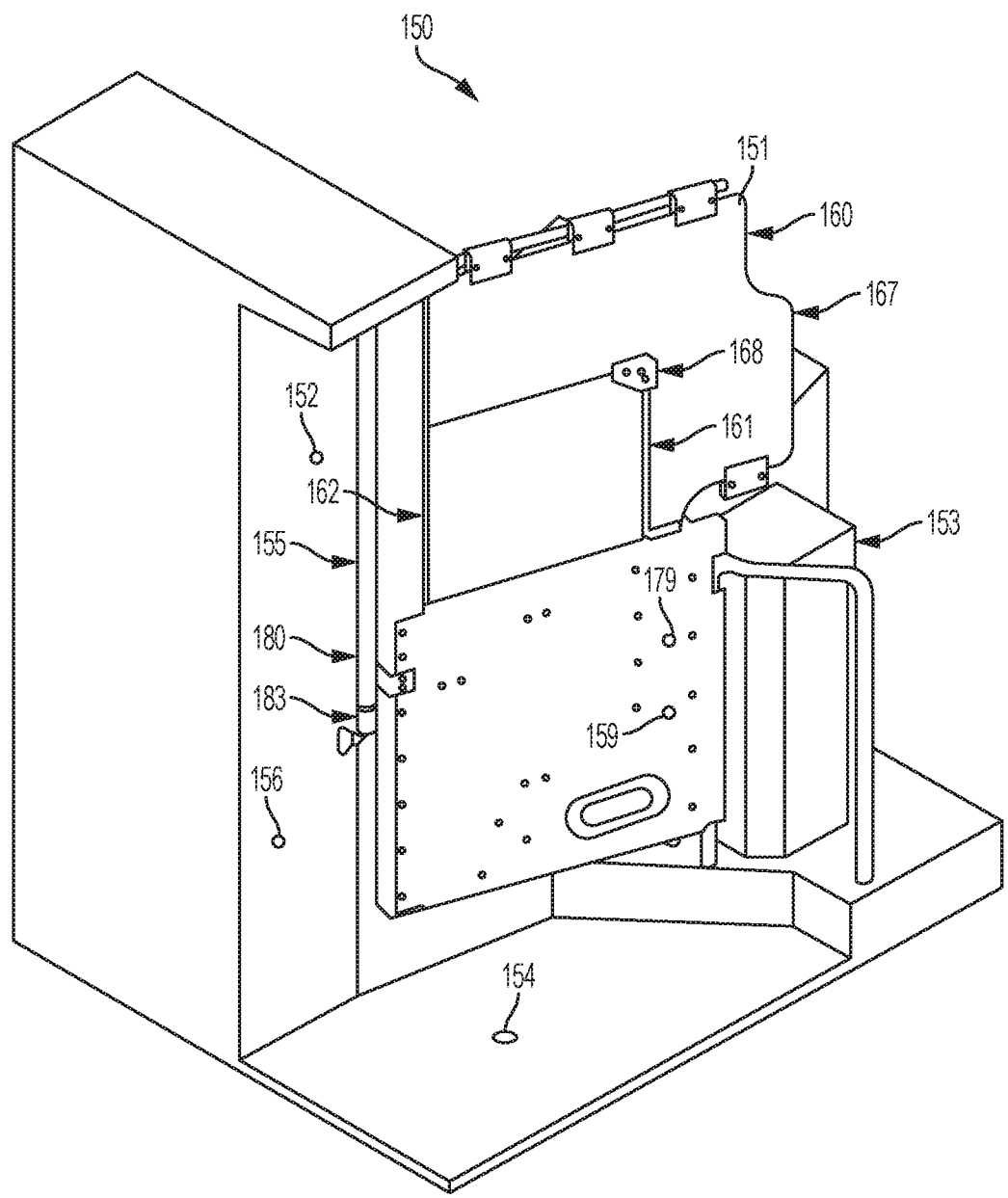
FIG. 26 is an exterior perspective view of a driver's protective enclosure having a barrier door according to another example of the present disclosure.

With reference to FIGS. 23-25, according to an alternative example of the present disclosure, the driver's protective enclosure 100 may alternatively or additionally incorporate a configuration for creating a ventilation air flow 118 about the hinge structure 105 of the barrier door 107. As shown, the barrier door 107 is coupled to the rear screen 101 via the hinge structure 105. An extension 116 located substantially at the location of the hinge structure 105 along the rear screen 101 defines a plenum with an electric blower 117 positioned therein. The plenum of the extension 116 and the electric blower 117 create the flow of air 118 into or out of the driver's protective enclosure 100. A gap 119 may be formed between the rear screen 101 and the barrier door 107 to allow for the air flow 118 to enter or exit the driver's protective enclosure 100. The extension 116 is generally configured to provide a complete barrier between the rear screen 101 and the barrier door 107 for both security reasons and to prevent air from escaping from the extension 116. However, it is to be appreciated that an airtight environmental seal is not required between the rear screen 101 and the barrier door 107.

The electric blower 117 positioned within the extension 116 is shown as a tangential blower having a vertical axis. However, it is to be appreciated that the electric blower 117 may be of any configuration found to be suitable by those having ordinary skill in the art. For instance, the electric blower 117 could be a radial blower or any other suitable blower as needed for a particular configuration of the driver's protective enclosure 100.

According to the alternative example of FIGS. 23-25, electrical wiring does not need to be run into the barrier door 107 in order to operate a ventilation system. Accordingly, a ventilation system according to this example may reduce the overall complexity of installation and maintenance.

According to another example of the disclosure, the electric blower 111, 117 of any of the previously described examples may incorporate a heating and/or cooling element, thereby providing additional and improved localized climate control for the driver. Additionally, according to another example, the electric blower 111, 117 may incorporate speed and/or directional controls to allow for more adjustability in the environmental conditions within the enclosure.

In accordance with another example of the disclosure, any of the ventilation systems described above could be configured to incorporate a thermostat therewith, allowing for the control of the on/off state, speed, and/or direction of the electric blower 111, 117 to be automated. Furthermore, if a heating and/or cooling element are incorporated, the thermostat may be used to regulate the state of those features, as well.

In accordance with another example, any of the ventilation systems described above could be constructed to incorporate one or more sensors configured to stop the electric blowers 111, 117 from operating when the barrier door 107 is opened. Such a configuration would prevent unnecessary operation of the electric blowers 111, 117 when the driver is either not present in the protective enclosure 100 or does not require the closure of the barrier door 107.

With reference to FIGS. 26-35, a driver's protective enclosure 150 for a transit vehicle is shown in accordance with another example of the present disclosure. As shown, the driver's protective enclosure 150 is located in the left front portion of the vehicle (e.g., a bus). It is to be appreciated that other locations for the driver's protective enclosure 150 are possible. A rear screen 152 is located directly behind the driver's position within the protective enclosure 150 to provide a separation between the rear of the driver's position and the passenger section of the vehicle. The rear screen 152 may be completely non-transparent or it may incorporate windows or other transparent features therein. Adjacent to the driver's protective enclosure 150 may be a fare box 153, which enables passengers to pay fares while entering or exiting the vehicle.

Coupled to the rear screen 152 is a barrier door 151. The barrier door 151 is configured to rotate about a hinge structure 155 which runs vertically between respective mounting points along an edge of the rear screen 152. The barrier door 151 is placed at a sufficient distance from the entrance to the vehicle to allow for unhindered access to passengers, including those in wheelchairs. The barrier door 151 may also be positioned above a floor level 154 of the vehicle so as to provide adequate clearance. However, it is to be appreciated that the barrier door 151 may reach entirely to the floor level 154. Additionally, while the barrier door 151 provides adequate clearance for passengers, it is also positioned at an adequate distance away from the driver's position so as to comfortably provide the driver with access to all of the controls in the driver's protective enclosure 150.

As noted above, the barrier door 151 is configured to be coupled to an edge of the rear screen 152 via the hinge structure 155. The barrier door 151 may be configured so as to rotate through the aisle (i.e., outward toward the passenger entrance) to be stowed against a structure 156 located on the rear screen 152. However, alternative methods of coupling and/or stowing the barrier door 151, such as a sliding mechanism or forward swinging door, are also possible.

Figure 27:
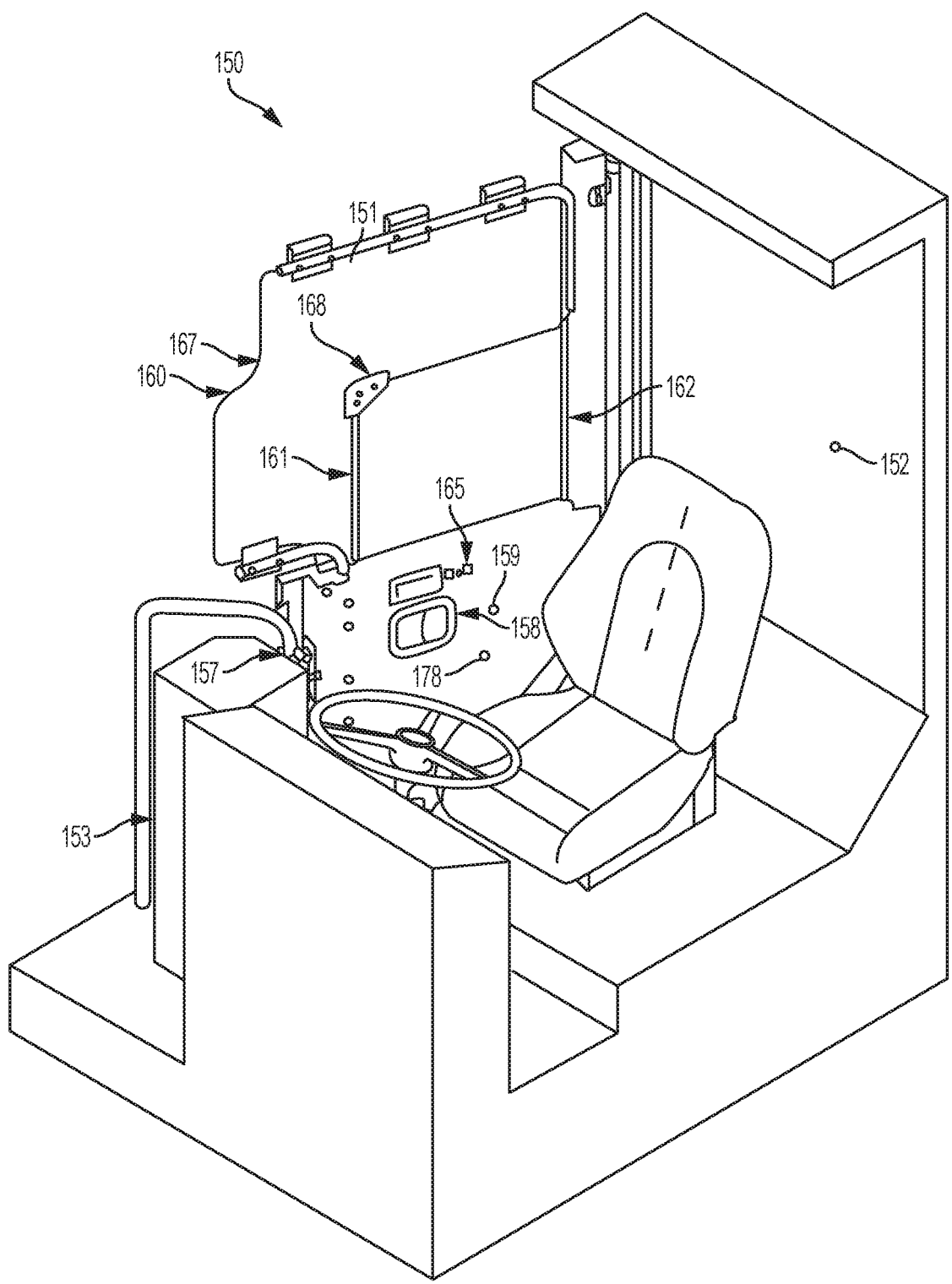
FIG. 27 is an interior perspective view of the driver's protective enclosure of FIG. 26.
Figure 28:
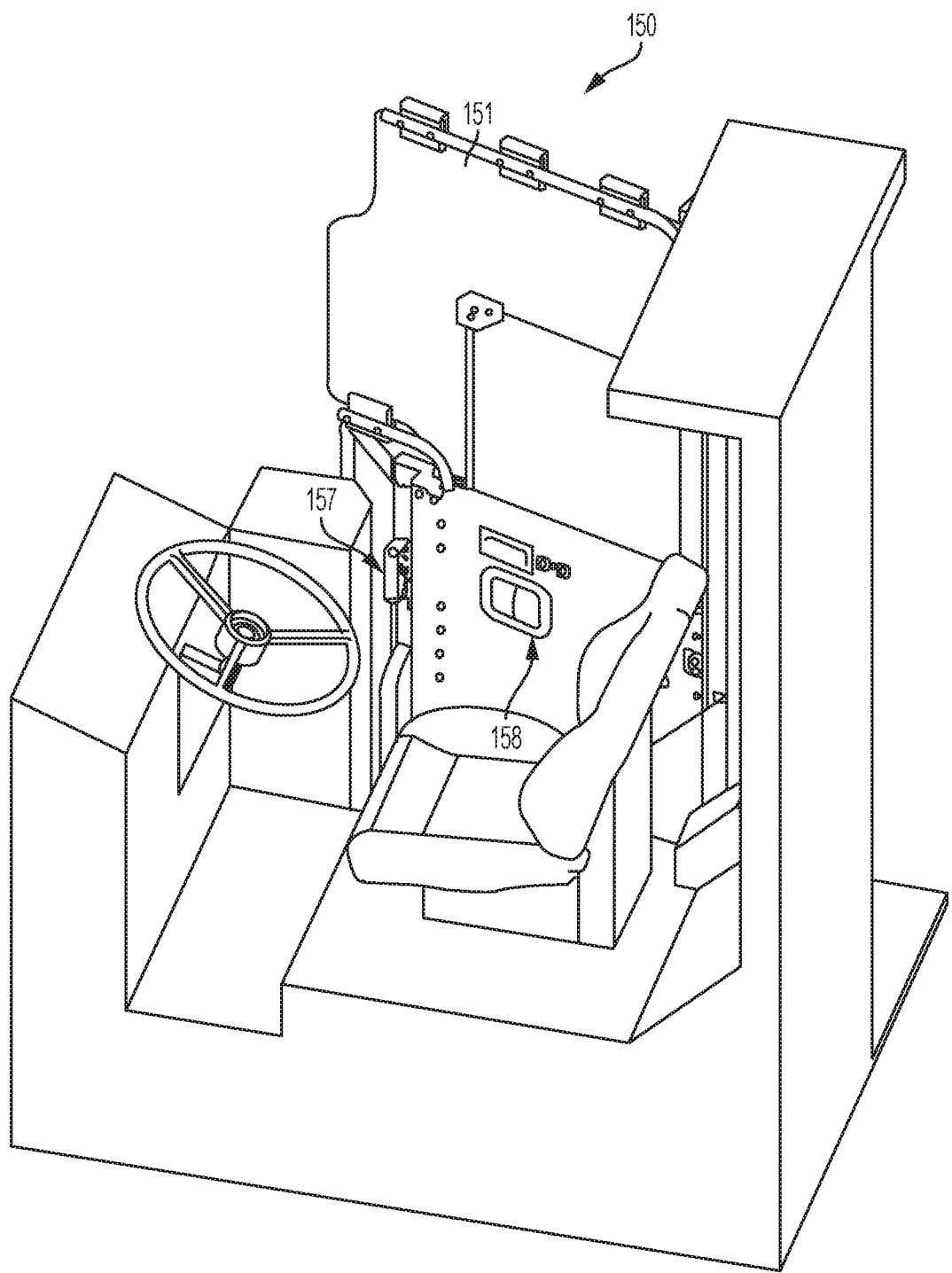
FIG. 28 is another interior perspective view of the driver's protective enclosure of FIG. 26.

The barrier door 151 also includes a latch 157 at a forward end thereof. The latch 157 is operable to secure the barrier door 151 in a closed position. As shown in FIGS. 27 and 28, a latch release control 158, such as a release lever, is positioned on the interior side of the barrier door 151 so as to be easily accessible by the driver to exit the driver's protective enclosure 150. While ideally positioned to deter easy access by a passenger or other occupant of the vehicle, the latch release control 158 is positioned at an area of the barrier door 151 that can be accessed from the outside in the event of an emergency, through an opening in an upper section 160 of the barrier door 151. It is to be appreciated that alternative latch and latch release mechanisms may be used, including positioning the latch 157 at the rearward end of the barrier door 151 and the hinge structure 155 at the forward end.

Figure 29:
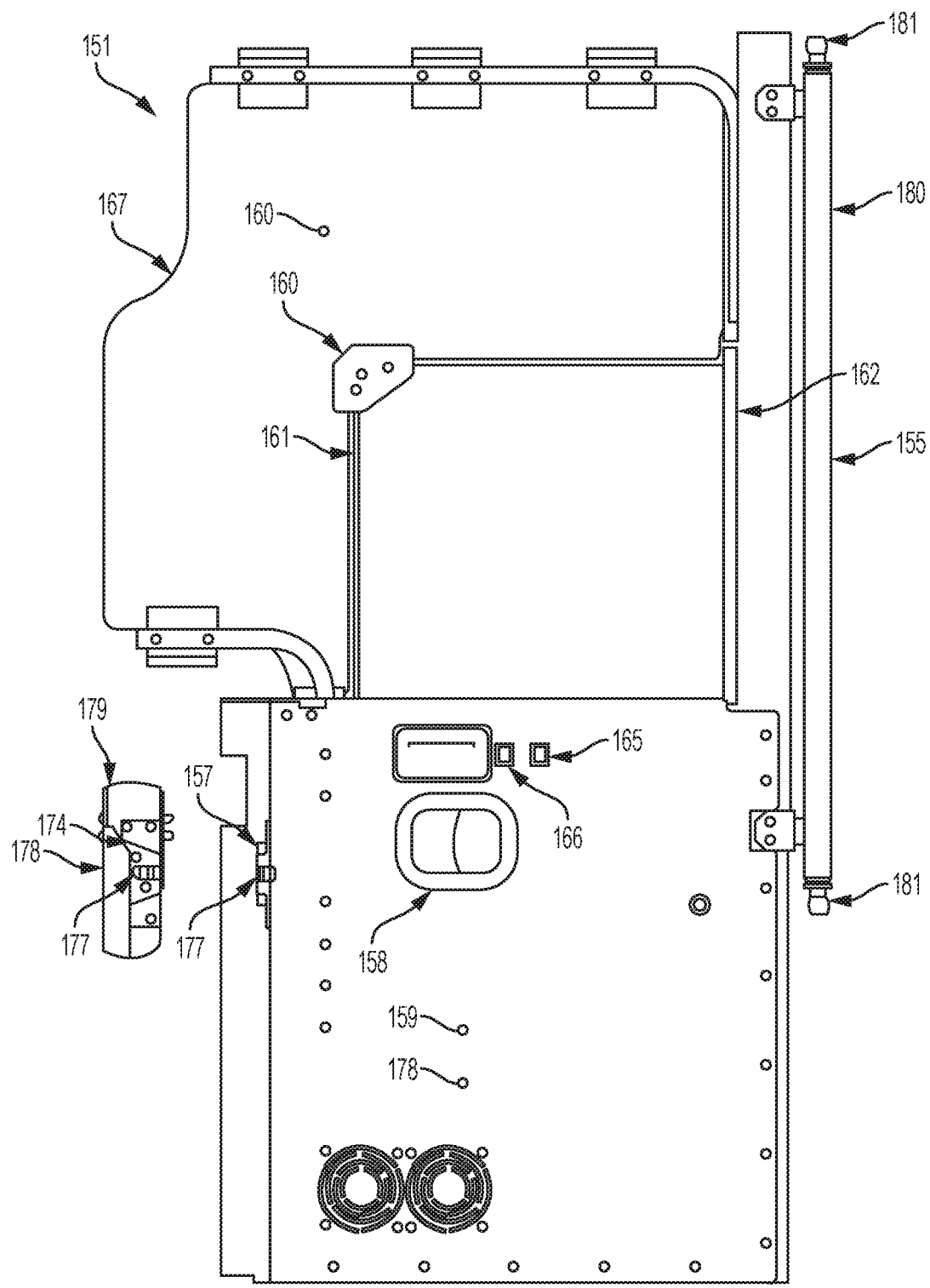
FIG. 29 is an interior side view of the barrier door of the driver's protective enclosure of FIG. 26.
Figure 30:
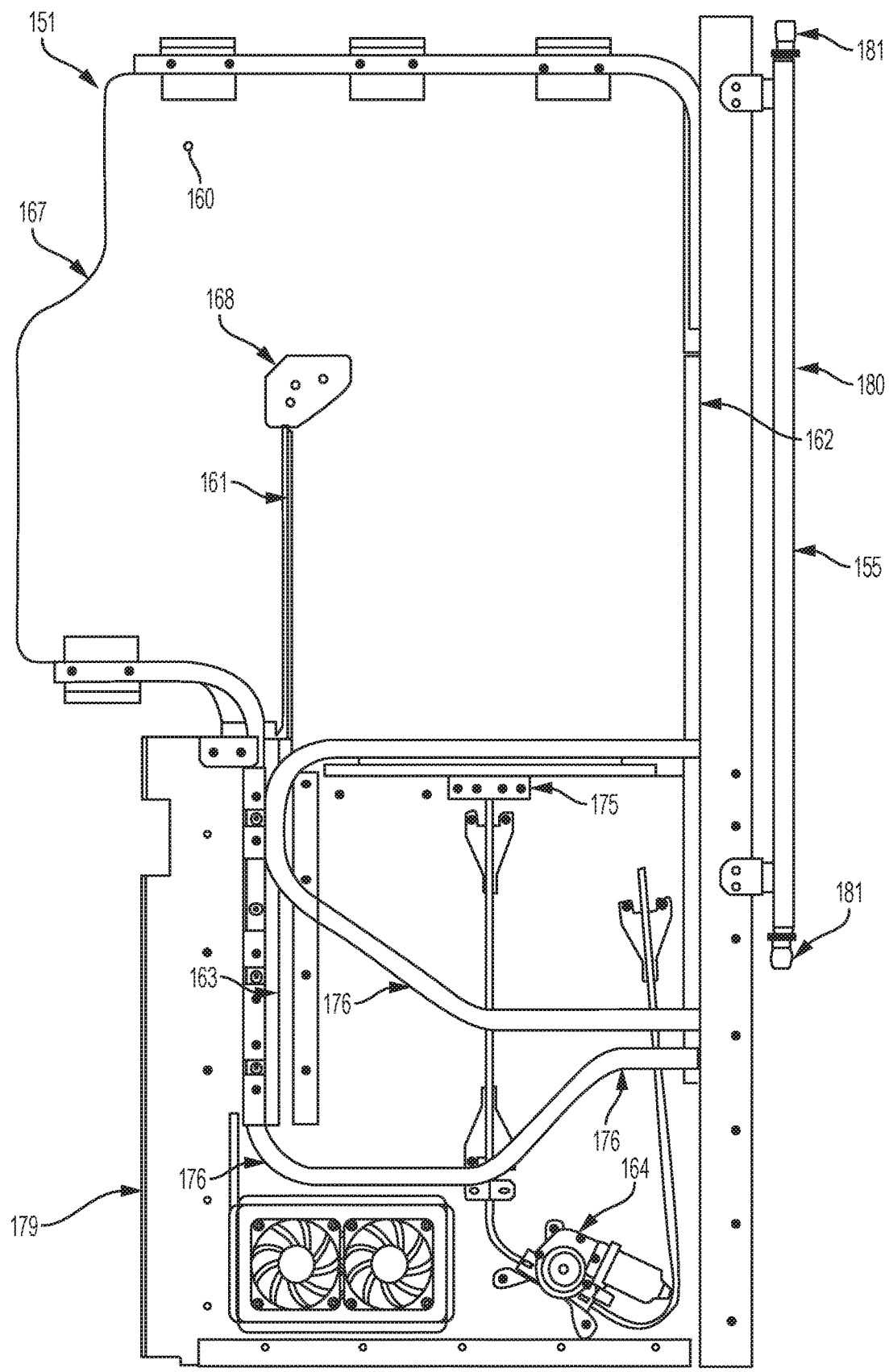
FIG. 30 is an interior side view of the barrier door of FIG. 29 with an inner panel removed.

With reference to FIGS. 26-30, the barrier door 151 includes a lower section 159 and an upper section 160. The lower section 159 may be made from a rigid, non-transparent material such as steel or a similar metal material or a plastic material, but may incorporate additional windows or transparent sections as found to be suitable. The upper section 160 is formed from a light transmissive material. In particular, the upper section 160 may be made from a transparent material or materials, such as laminated glass or polycarbonate. The upper section 160 includes an inner movable panel or window 161 disposed within an outer stationary panel or window 167. The inner movable window 161 is mounted for vertical movement between a lowered position in which the inner movable window 161 is at least partially withdrawn into the lower section 159 to form an opening in the upper section 160 and a raised position in which the inner movable window 161 closes the opening. The inner movable window 161 is mounted for vertical movement in a forward channel structure 163 and a rearward channel structure 162 (or any other suitable vertical guide structure), and is supported from below by a lift device 164. According to one example, the lift device is an electromechanical lift device 164, such as a window regulator. The lift device 164 operates to raise and lower the inner movable window 161 within the channel structures 162, 163. As shown in FIG. 30, the lift device 164 may be a cable-driven electromechanical lift device. It is to be appreciated that the lift device 164 may be of any type known to be suitable to those having ordinary skill in the art, such as a scissor lift or parallel pulley.

The electromechanical lift device 164 is controlled by a window regulator controller 165. Incorporated into the window regulator controller 165 is a system that monitors the current of the motor of the electromechanical lift device 164 and identifies increases in current draw. An increase in current draw may indicate that the inner movable window 161 is being restricted from being closed (or opened), perhaps through collision with an object, such as a person's hand. Accordingly, when an increase in current draw over a predetermined amount is determined, window regulator controller 165 may respond by halting any upward motion of the inner movable window 161, thereby acting to prevent pinching of a hand or other object between the inner movable window 161 and another portion of the upper section 160. In such an instance, the window regulator controller 165 may be configured to hold inner movable window 161 in place, retract the inner movable window 161 slightly downward to release any trapped objects, or automatically fully retract the inner movable window 161. The window regulator controller 165 may also be configured to impart any combination and/or variation of the above reactions based on an indication of increased current draw. The same system that monitors the current draw may also be utilized to stop motion of the inner movable window 161 in a fully-up or fully-down position. Alternatively, limit switches or position sensors may be incorporated to set the fully-up or fully-down position of the inner movable window 161. A light curtain or object detection sensor, such as an ultrasonic sensor, could also be used to detect an object impeding the inner movable window 161 so as to stop motion of the inner movable window 161. Furthermore, various commercially-available contact-based or resistive force anti-pinch sensors could be incorporated into the barrier door 151 for additional protection.

With reference to FIG. 29, the interior side of the barrier door 151 includes an up/down control 166, which enables the driver to easily control the upward and downward movement of the inner movable window 161. The window regulator controller 165 may be configured such that a momentary press of the up/down control 166 may trigger the window to automatically travel to the fully-up or fully-down position, respectively. The up/down control 166 may include two buttons, a toggle switch, a lever, or any other two-way user interface found to be suitable to those having ordinary skill in the art. According to another example of the present disclosure, the up/down control 166 may also incorporate a control for operating the blowers 111 of a ventilation system 69, 120 as discussed above with reference to the examples of FIGS. 1-25.

Figure 35:
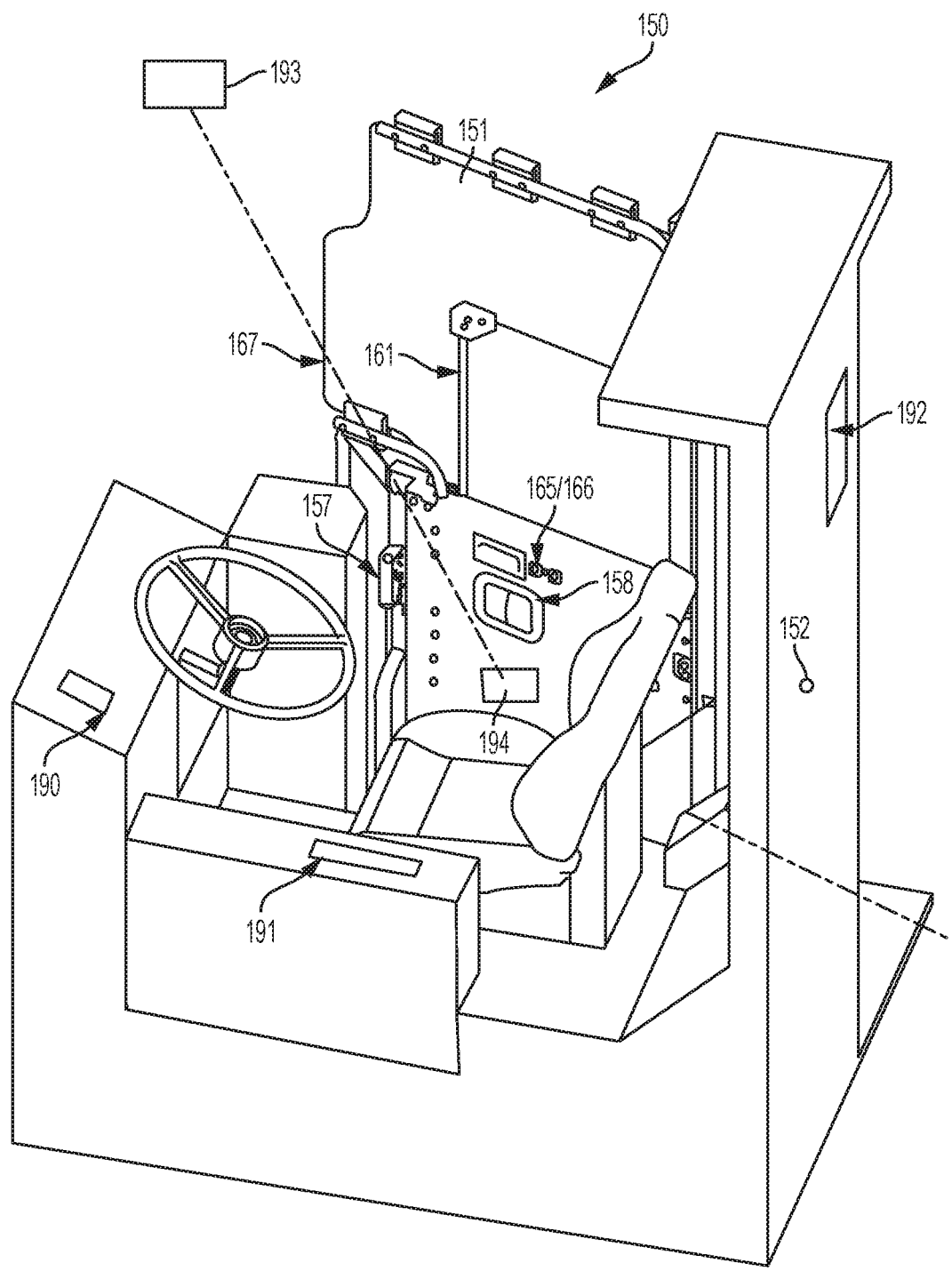
FIG. 35 is an interior perspective view of the driver's protective enclosure of FIG. 26 according to an alternative example of the present disclosure.

With reference to FIG. 35, according to an alternative example of the present disclosure, the driver's protective enclosure 150 may incorporate additional or alternative controls 190, 191, 192 positioned away from the barrier door 151 to operate the electromechanical lift device 164 to move the inner movable window 161 between the raised and lowered positions. For instance, a set of controls 190 may be incorporated in the dashboard or instrument panel in front of the driver's position. Another set of controls 191 may be incorporated into a side panel of the vehicle to the left of the driver's position. The controls may also be located in alternate locations for different configurations of the vehicle, such as if the vehicle is designed to drive on the left side of the road, in which case the driver's protective enclosure 150 and the controls would have a reverse configuration.

According to another example, a set of controls 192 may be placed on the exterior of the driver's enclosure, such as on the rear screen 152. Such a set of controls 192 would allow for access to the driver's protective enclosure 150 from the outside in the event of an emergency. The exterior controls 192 may be secured behind a locked cover or similar apparatus or may require a key to enable actuation to prevent tampering and unauthorized use of the controls 192.

The controls could be incorporated in a cluster with other controls such as the controller for the exterior doors of the vehicle. Multiple control locations could also be incorporated if found to be suitable to provide an alternate location to access the controls for convenience and safety, such as to unlatch the barrier door 151 in an emergency. The controls could also incorporate a security feature, such as a locking device, to prevent unauthorized use. The controls could also incorporate a covering device, such as a "molly-guard", to prevent accidental activation. Depending on the location of the control, additional safety features may be incorporated, such as an anti-pinch function to prevent injury in the event that a powered window is closed from a position where visibility is temporarily obstructed.

An additional safety feature that may be provided is that the window controls 165, 166, 190, 191 located inside the driver's protective enclosure 150 will be designed to override the external controls 192. As an additional measure to prevent nuisance activation, the controls in the driver's protective enclosure 150 may be set such that a single press in the "window up" direction, which would typically be activated to automatically lift the window to the fully raised and closed position, will override the external controls 192 for a configurable duration of time.

According to another example of the present disclosure, the barrier door 151 includes a controller device 194 configured to activate the electromechanical lift device 164 to raise or lower the inner movable window 161. The controller device 194 is in communication with a remote telecommunications device 193 that is programmed to transmit commands to the controller device 194 to operate the electromechanical lift device 164.

According to the example, a telecommunications device 193, such as a computer, incorporating a window control may be made available to a person at a remote location, such as a security officer's location at the bus depot or station. This availability would be combined with a mechanism to alert the security officer of an emergency situation, such as an intercom, emergency alarm button, or remote video feed.

According to another example, the telecommunications device 193 may be a phone, and a phone number would be established that could be called from any phone. An automated system would be able to take the bus number and a security code available only to authorized users, such as emergency first responders, that would then allow them to access an automated menu (e.g., press "1" for auto-down, press "2" for unlatch) that would allow them to issue commands to the controller device 194 to activate an auto-down window function or unlatch a powered latch. The security codes could be replaced in the event of a data breach or as a regular rotation to prevent unauthorized access.

According to another example, the functions described above are implemented in an application for a smart phone device. The application could be set up to only be loaded onto authorized devices. Additionally, security codes could also be used as discussed above to ensure that only authorized users have access. The smart phone application could allow more nuanced controls, such as a virtual window control. Such controls could also be used by the driver as the primary controls for the electromechanical lift device 164 or other devices incorporated in the barrier door 151.

According to another example, the electromechanical lift device 164 may incorporate a power storage device that could be used in the event of a power failure to automatically lower the inner movable window 161 to a position where the latch release control 158 is accessible or would automatically set the electromechanical lift device 164 to a state where the inner movable window 161 can be pushed down to a position allowing access using a positive but reasonable force. Restoration of power would not cause the inner movable window 161 to be lifted back to the raised position unless controlled to do so. Restoration of power would re-engage the electromechanical lift device 164 to prevent back-driving of the inner movable window 161 when power is present. This would also allow access to the driver's protective enclosure 150 when the vehicle has been shut down.

According to another example, the use of the external controls 192 would trigger an emergency alert condition on the vehicle that would sound an internal alarm, alert a security officer at a central location such as bus depot or station, and/or alert emergency responders. Warnings and/or physical guards would be placed over the external controls 192 to prevent inadvertent activation. A secure bypass mechanism could be included to allow an authorized user to activate the external controls 192 without setting off the emergency alerts, such as if the driver was accidentally locked out of the driver's protective enclosure 150.

It is to be appreciated that the electromechanical lift device 164, the window regulator controller 165, the up/down control 166, the sets of controls 190, 191, 192 located outside the barrier door 151, and the controller device 194 configured to communicate with an external telecommunications device 193, according to the examples discussed above with reference to FIGS. 26-35 may also be incorporated into the driver's protective enclosure 10 and the barrier door 15 discussed above with reference to FIGS. 1-17.

With reference to FIGS. 29 and 30, the upper section 160 of the barrier door 151 includes the stationary outer window 167, which is located above and forward of the inner movable window 161. The stationary outer window 167 provides additional coverage and protection above and outside of the inner movable window 161. The inner movable window 161 must be able to travel into the lower section 159 when the inner movable window 161 is in the down position. Accordingly, the inner movable window 161 cannot extend beyond the dimensions of the lower section 159 and it also can extend only to a limited height above the lower section 159. The stationary outer window 167 provides coverage areas forward and rearward of the lower section 159 where the inner movable window 161 is unable to reach. The stationary outer window 167 is positioned to be coplanar with the inner movable window 161 and with a minimal gap between the inner movable window (when at least partially closed) and the adjacent portions of the outer stationary window 167. The outer stationary window 167 may include cut-out areas in strategic locations to provide the driver with an unobstructed view of the rearview and side-view mirrors. The outer stationary window may be formed from the same material as the inner movable window 161 or may be formed from a different light transmissive or transparent material as found to be suitable to those having ordinary skill in the art.

As discussed above, the inner movable window 161 is supported by the rearward channel structure 162 on the rearward side of the barrier door 151 and by the forward channel structure 163 on the forward side of the barrier door 151. The forward channel structure 163 is disposed only in the lower section 159 of the barrier door 151 and can only support the inner movable window 161 at regions below the upper jamb of the barrier door 151, thereby reducing the effectiveness of the support on the forward side as the inner movable window 161 travels upward to the raised position. To counter this reduced effectiveness and provide increased overall security of the barrier door 151, the outer stationary window 167 may further include an anti-rattle pocket 168.

Figure 31:
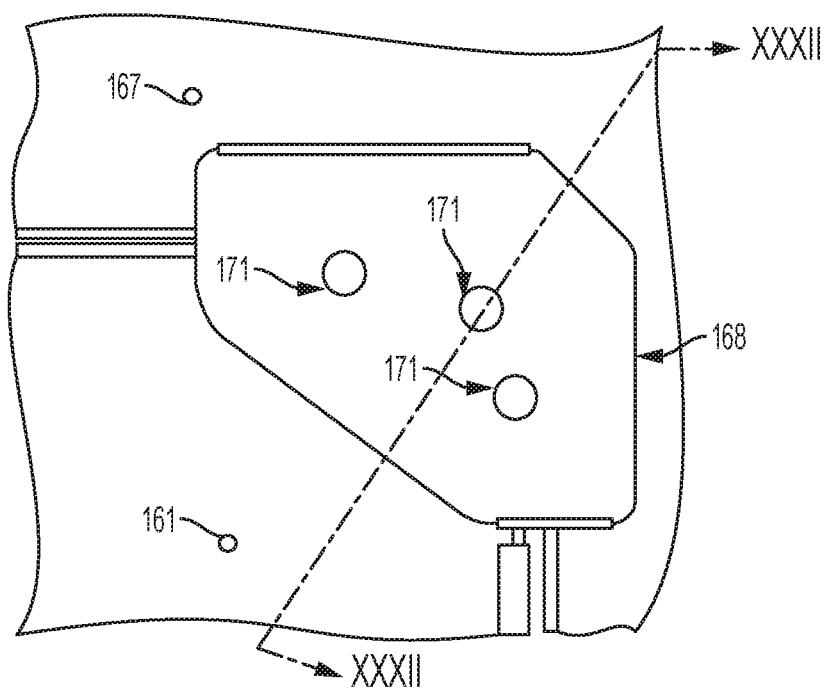
FIG. 31 is an enlarged view of a portion of an upper section of the barrier door of FIG. 29.
Figure 32:
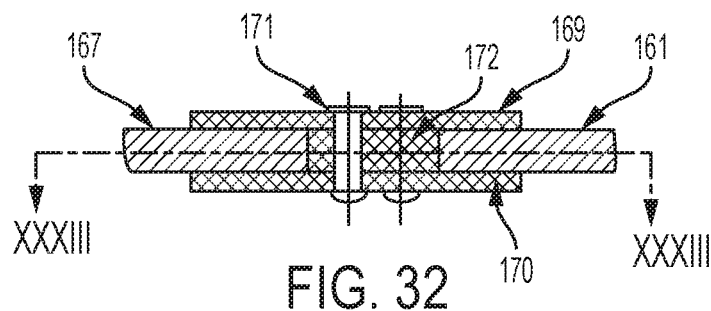
FIG. 32 is an enlarged cross-sectional view taken along lines XXXII-XXXII shown in FIG. 31.
Figure 33:
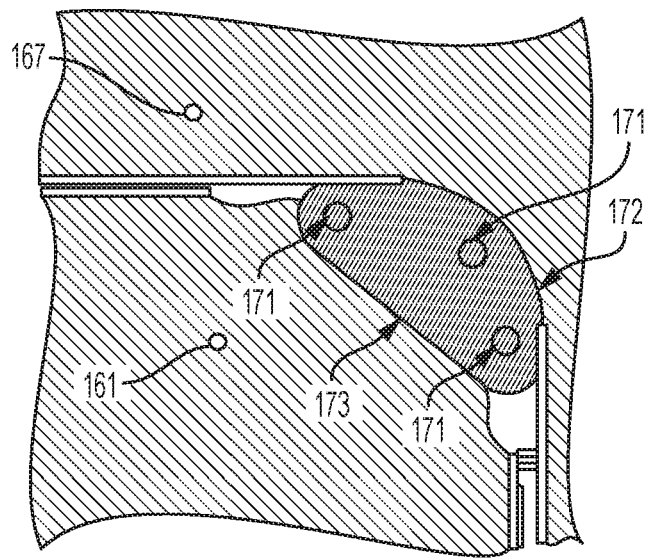
FIG. 33 is an enlarged cross-sectional view taken along lines XXXIII-XXXIII shown in FIG. 32.

As shown in FIGS. 31-33, according to one example, the anti-rattle pocket 168 is located at one corner of the opening in the upper section 160 that accommodates the inner movable window 161. The anti-rattle pocket 168 is constructed from two plates 169, 170, each being formed from a light transmissive or transparent material to allow visibility therethrough. The plates 169, 170 are connected to each other and the stationary outer window 167 via barrel bolts, threaded inserts, or similar fasteners 171. Portions of the plates 169, 170 overhang into the region in which the inner movable window 161 passes when nearing the fully-up position. In this manner, the plates 169, 170 provide support on each side of the inner movable window 161 as it reaches the raised position. The edges of the plates 169, 170 may incorporate lead-in chamfers to allow for easier entry of the inner movable window 161 as it travels to the raised position. Additionally, the anti-rattle pocket 168 may be constructed to be slightly narrower than the thickness of the inner movable window 161 so as to provide a slight positive retention force on the inner movable window 161, which acts to reduce vibration caused by the interaction between the inner movable window 161 and the plates 169, 170.

According to an alternative example, the upper section 160 may include a pocket extending along the length of the path of the inner movable window 161, effectively extending the forward channel structure 163 upward into the upper section 160. In this example, the extended channel structure may include an H-shaped section of clear extruded channel in order to maintain the complete transparency of the upper section 160.

According to another alternative example, the plates 169, 170 may be secured via a clear adhesive instead of by the fasteners 171.

In the event that the material forming the upper section 160 is not suitable for having through-holes formed therein, such as a laminated tempered safety glass, a plug 172 may be formed from an elastomer material for further vibration dampening. The plug 172 may be formed to have a slightly smaller thickness than the material of the upper section 160 in order to force the plates 169, 170 or support panels to squeeze against the surfaces of the upper section 160, thereby securing the plug 172. Furthermore, the base of anti-rattle pocket 168 may comprise an angled surface 173 relative to the inner movable window 161. This angled surface 173 may provide a jamming force to positively secure the inner movable window 161 in place in the fully-up position, thereby preventing the rattle noises commonly caused by vibration of the vehicle.

With reference to FIGS. 29 and 30, a latch mechanism 177 for the barrier door 151 may incorporate a dovetail 174. Due to the increased weight of barrier door 151 having both a lower section 159 and an upper section 160, there is a need to provide added support at the latching location to prevent door sag, as well as to prevent rattle. Dovetail 174 acts as a wedge to vertically support the barrier door 151 at the forward side. The dovetail 174 and/or latch mechanism 177 may further incorporate spring-loaded features that can be used to provide back pressure on latch 157 on the barrier door 151, thereby helping to prevent rattle. A commercially-available latch mechanism with an integral spring-loaded dovetail, such as that offered by A. L. Hansen Manufacturing of Waukegan, Ill., may be used to incorporate these features.

As shown in FIGS. 29 and 30, the channel structures 162, 163, electromechanical lift device 164, and support hardware 175 are mounted on an internal framework 176 within the lower section 159 of barrier door 151. The framework 176 and channel structures 162, 163 may be sized to have a limited number of configurations suitable for most common bus (or other transit vehicle) structures. Conversely, the latch mechanism 177 may be mounted separately on sheet metal panels that form an inner panel 178 and an outer panel 179 of barrier door 151. In this manner, the internal framework 176, inner movable window 161, and other internal components of the lower section 159 may be standardized, thereby taking advantage of economies of scale for production. On the other hand, the inner panel 178 and the outer panel 179 can be individually sized and customized to accommodate variations in vehicle models. The outer stationary window 167 may also be customized based upon the vehicle model and barrier requirements, while maintaining the inner movable window 161 as a standard size.

In addition to the changes in the panels 178, 179 and the outer stationary window 167 of the barrier door 151 to accommodate differences in vehicle size, the hinge structure 155, which includes a shaft 180 and pin 181 construction may also be modified. For example, the length of shaft 180 and pin 181 could be modified to accommodate variable hinge mount heights for different vehicles. Furthermore, the shaft 180 and pin 181 may be incorporated into existing bus stanchions in the event that the stanchion is the preferred mounting point. Accordingly, the overall construction of barrier door 151 is adaptable to many vehicle models and sizes.

Figure 34:
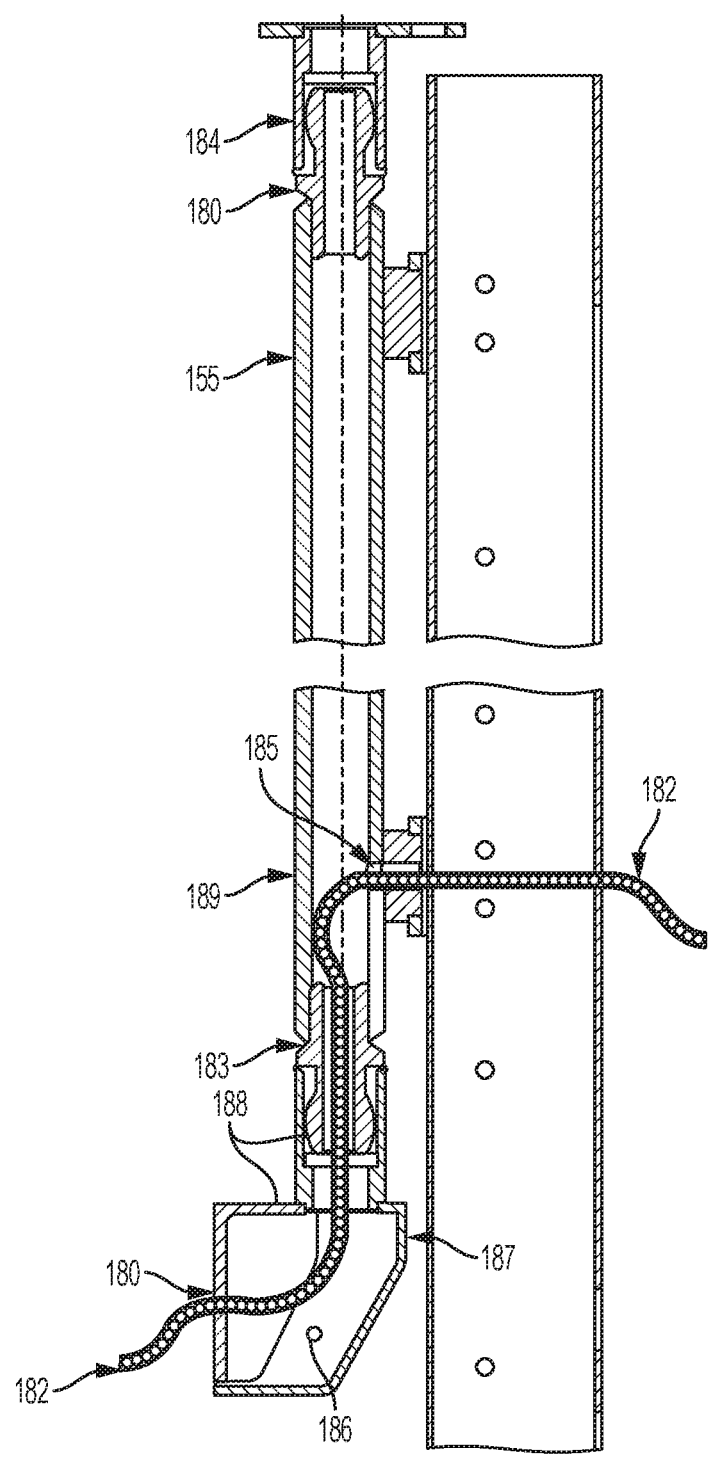
FIG. 34 is a cross-sectional view of a hinge structure of the barrier door of FIG. 29.

With reference to FIG. 34, according to an example of the present disclosure, the hinge structure 155 of the barrier door 151 is configured to accommodate electrical wiring 182 extending from the structure of the vehicle to the barrier door 151. As shown, the electrical wiring 182 leads to the electromechanical lift device 164, along with any associated accessories requiring electrical connection within the barrier door 151. The electrical wiring 182 is routed through hinge structure 155 so as to prevent tampering from the outside of the protective enclosure 150. A hinge shaft 189 is constructed to be hollow, with a hollow pin 183 at each end inserted into an upper hinge receptacle 184 and a lower hinge receptacle 188, respectively, each having an integral friction bearing which may be comprised of vibration attenuating bearing material. The connection from the hinge shaft 189 to the barrier door 151 includes a pass-through hole 185, which allows electrical cabling to be routed from the door into the hinge shaft 189. The base of the lower hinge receptacle 188 is constructed in such a way as to have a hollow area 186 in a lower region, with a cover 187. With this construction, cabling is able to be routed from the base of the lower hinge receptacle 188 to the pass-through hole 185 in the hinge mounting surface. While shown in the lower hinge receptacle 188, it is to be understood that the pass-through of electrical cabling could also be accomplished via the upper hinge receptacle 184.

Further examples of the present disclosure will now be described in the following numbered clauses.

Clause 1: A barrier door (15, 151) for a protective enclosure (10, 150), the barrier door (15, 151) comprising: a lower section (19, 159); and an upper section (20, 160), the upper section (20, 160) comprising an outer stationary portion (22, 167) and an inner movable portion (21, 161) disposed within the outer stationary portion, wherein the outer stationary portion (22, 167) and the inner movable portion (21, 161) are light transmissive, wherein the inner movable portion (21, 161) is movable in a vertical direction and is coupled to a lift device (25, 164) disposed in the lower section (19, 159), and wherein the lift device (25, 164) is configured to move the inner movable portion (21, 161) between a lowered position in which the inner movable portion (21, 161) is at least partially withdrawn into the lower section (19, 159) to form an opening in the upper section (20, 160) and a raised position in which the inner movable portion (21, 161) is extended to close the opening.

Clause 2: The barrier door (151) according to clause 1, further comprising: a forward channel structure (23, 163); and a rearward channel structure (24, 162), wherein the forward channel structure (23, 163) and the rearward channel structure (24, 162) extend vertically to slidably support the inner movable portion (21, 161), wherein the forward channel structure (23, 163) is disposed in the lower section (19, 159) and the rearward channel structure is disposed in the lower section (19, 159) and the upper section (20, 160).

Clause 3: The barrier door (15) according to clause 2, wherein a light transmissive channel (39) is disposed on the outer stationary portion (22) of the upper section (20) to slidably support the inner movable portion (21) above the forward channel structure (23).

Clause 4: The barrier door (15) according to clauses 2 or 3, wherein the forward channel structure comprises a forward support beam (23) and the rearward channel structure comprises a rearward support beam (24).

Clause 5: The barrier door (15) according to clause 4, wherein at least one of the forward support beam (23) and the rearward support beam (24) comprises a plurality of cushioning strips (26) configured to slidably support the inner movable portion (21) within the rearward support beam (24).

Clause 6: The barrier door (15) according to clause 4 or clause 5, wherein the rearward support beam (24) also supports the outer stationary portion (22) above the inner movable portion (21).

Clause 7: The barrier door (15) according to clause 6, wherein the rearward support beam (24) comprises filler plugs (27) to support the outer stationary portion (22) within the rearward support beam (24).

Clause 8: The barrier door (15) according to clause 6 or clause 7, further comprising a plurality of beams (29, 30, 31) configured to mount the outer stationary portion (22) on the lower section (19), wherein at least two of the plurality of beams (29, 30) cooperate to form a corner structure configured to hold a lower, forward corner of the outer stationary portion (22), and wherein at least one of the plurality of beams (31) is configured to cooperate with the rearward support beam (24) to form a corner structure configured to hold an upper, rearward corner of the outer stationary portion (22).

Clause 9: The barrier door (15) according to clause 8, wherein each of the plurality of beams (29, 30, 31) comprises an inner clip and an outer clip configured to hold the outer stationary portion (22) therebetween.

Clause 10: The barrier door (15) according to any one of clauses 4-9, wherein the lower section (19) comprises an interior panel (45) defining an interior side of the lower section (19), wherein a portion of the interior panel (45) is disposed within a receiving channel (43) defined within the rearward support beam (24), and wherein at least one brace (40, 41) is also disposed within the receiving channel (43).

Clause 11: The barrier door (15) according to clause 10, wherein the at least one brace (40, 41) comprises an angled flange (42) configured to be received in a slot (44) defined in the rearward support beam (24) to secure the at least one brace (40, 41) to the rearward support beam (24).

Clause 12: The barrier door (15) according to clause 10 or clause 11, wherein the at least one brace (40, 41) comprises a hook opening (71, 72) configured to engage a pin (47) extending through the rearward support beam (24) to secure the at least one brace (40, 41) to the rearward support beam (24).

Clause 13: The barrier door (15) according to any one of clauses 4-12, wherein the lower section (19) comprises an exterior panel (48) defining an exterior side of the lower section (19), wherein the exterior panel (48) comprises a curved end (49) and the rearward support beam (24) comprises a corresponding groove (50) defined therein, and wherein the curved end (49) of the exterior panel (48) is received within the corresponding groove (50) of the rearward support beam (24) to secure the exterior panel (48) to the rearward support beam (24).

Clause 14: The barrier door (15) according to any one of clauses 4-13, further comprising a hinge structure (14) mounted on the rearward support beam (24), wherein the hinge structure (14) comprises upper and lower adjustable brackets (53) connected to the rearward support beam (24), and wherein the adjustable brackets (53) support spherical hinge pins (54) configured to engage mounting brackets (55) for supporting the door (15) on the protective enclosure (10).

Clause 15: The barrier door (15) according to clause 14, wherein the spherical hinge pins (54), the adjustable brackets (53), and the rearward support beam (24) are configured to accommodate a wiring harness (63) extending from the protective enclosure (10) to an interior of the lower section (19).

Clause 16: The barrier door (151) according to any one of clauses 1-15, wherein the upper section (160) further comprises an anti-rattle pocket (168) disposed on the outer stationary portion (167), wherein the anti-rattle pocket (168) is configured to engage the inner movable portion (161) in the raised position to limit vibration of the inner movable portion (161).

Clause 17: The barrier door (15, 151) according to any one of clauses 1-16, wherein the lift device comprises an electromechanical lift device (25, 164).

Clause 18: The barrier door (151) according to clause 17, further comprising controls (165, 166) for the electromechanical lift device (164).

Clause 19: The barrier door (15, 151) according to any one of clauses 1-18, further comprising a latch (17, 157) configured to secure the door (15, 151) in a closed position and a latch release control (18, 158) configured to open the latch (17, 157).

Clause 20: The barrier door (15, 151) according to any one of clauses 1-19, further comprising a latch (17, 157) configured to secure the door (15, 151) in a closed position and a latch release control (18, 158) configured to open the latch (17, 157) comprising an actuation lever (66) configured to open the latch (17, 157) and an additional control knob (67) configured to be manually engaged to disable the latch release control (18, 158).

Clause 21: The barrier door (15, 151) according to any one of clauses 1-19, further comprising a latch (17, 157) configured to secure the door (15, 151) in a closed position and a latch release control (18, 158) configured to open the latch (17, 157) comprising an actuation lever (66) configured to open the latch (17, 157) and an additional control knob (67) which is configured to be automatically engaged to disable the latch release control (18, 158).

Clause 22: The barrier door (15) according to any one of clauses 1-21, further comprising a ventilation system (69, 120) disposed in the lower section (19), the ventilation system (69, 120) being configured to direct air to or from the protective enclosure (10).

Clause 23: The barrier door (15) according to clause 22, wherein the ventilation system (120) comprises at least one blower (111) and a plenum (112).

Clause 24: A barrier door (107) for a protective enclosure (100), the barrier door (107) comprising: a lower section (108); an upper section (109), the upper section (109) being light transmissive; and a ventilation system (120) disposed within the lower section (108), the ventilation system (120) comprising at least one blower (111) and a plenum (112), wherein the ventilation system (120) is configured to direct air to or from the protective enclosure (100).

Clause 25: The barrier door (107) according to clause 24, wherein the at least one blower comprises two blowers (111).

Clause 26: The barrier door (107) according to clause 25, wherein the two blowers (111) are configured to direct air in the same direction.

Clause 27: The barrier door (107) according to clause 25 or clause 26, wherein one of the two blowers (111) is configured to direct air into the protective enclosure (100)

and the other of the two blowers (111) is configured to direct air away from the protective enclosure (100).

Clause 28: A driver's protective enclosure (10, 150) for a transit vehicle, the protective enclosure (10, 150) comprising: a rear screen (11, 152) disposed behind a driver's position in the protective enclosure (10, 150); a barrier door (15, 151), the barrier door comprising: a lower section (19, 159); and an upper section (20, 160), the upper section (20, 160) comprising an outer stationary portion (22, 167) and an inner movable portion (21, 161) disposed within the outer stationary portion (22, 167); and a hinge structure (14, 155) connecting the barrier door (15, 151) to the rear screen (11, 152), wherein the outer stationary portion (22, 167) and the inner movable portion (21, 161) are light transmissive, wherein the inner movable portion (21, 161) is movable in a vertical direction and is coupled to a lift device (25, 164) disposed in the lower section (19, 159), and wherein the lift device (25, 164) is configured to move the inner movable portion (21, 161) between a lowered position in which the inner movable portion (21, 161) is at least partially withdrawn into the lower section (19, 159) to form an opening in the upper section (20, 160) and a raised position in which the inner movable portion (21, 161) is extended to close the opening.

Clause 29: The driver's protective enclosure (10, 150) according to clause 28, wherein the barrier door (15, 151) further comprises: a forward channel structure (23, 163); and a rearward channel structure (24, 162), wherein the forward channel structure (23, 163) and the rearward channel structure (24, 162) extend vertically to slidably support the inner movable portion (21, 161), wherein the forward channel structure (23, 163) is disposed in the lower section (19, 159) and the rearward channel structure is disposed in the lower section (19, 159) and the upper section (20, 160).

Clause 30: The driver's protective enclosure (10) according to clause 29, wherein a light transmissive channel (39) is disposed on the outer stationary portion (22) of the upper section (20) to slidably support the inner movable portion (21) above the forward channel structure (23).

Clause 31: The driver's protective enclosure (10) according to any one of clauses 28-30, wherein the hinge structure (14) comprises: upper and lower adjustable brackets (53) connected to the barrier door (15), the adjustable brackets (53) supporting spherical hinge pins (54); and mounting brackets (55) connected to the rear screen (11), wherein the spherical hinge pins (54) rotatably engage the mounting brackets (55) to support the barrier door (15) on the rear screen (11).

Clause 32: The driver's protective enclosure (10) according to clause 31, wherein the spherical hinge pins (54), the adjustable brackets (53), and the lower section (19) of the barrier door (15) are configured to accommodate a wiring harness (63) extending from the rear screen (11) to an interior of the lower section (19).

Clause 33: The driver's protective enclosure (10, 150) according to any one of clauses 28-32, wherein the lift device comprises an electromechanical lift device (25, 164).

Clause 34: The driver's protective enclosure (150) according to clause 33, further comprising controls (165, 166) for the electromechanical lift device (164) disposed on the lower section (159) of the barrier door (151).

Clause 35: The driver's protective enclosure (150) according to clause 34, further comprising additional controls (190, 191, 192) for the electromechanical lift device (164) disposed on the protective enclosure (150) away from the barrier door (151).

Clause 36: The driver's protective enclosure (150) according to clause 35, wherein the additional controls (190, 191, 192) are disposed on at least one of a vehicle dashboard, a driver's side panel, and the rear screen (152).

Clause 37: The driver's protective enclosure (150) according to clause 33, further comprising controls (190, 191, 192) for the electromechanical lift device (164) disposed away from the door (151) on at least one of a vehicle dashboard, a driver's side panel, and the rear screen (152).

Clause 38: The driver's protective enclosure (150) according to any one of clauses 33-37, wherein a controller (194) configured to operate the electromechanical lift device (164) is disposed within the lower section (159) of the barrier door (151), and wherein the controller (194) is configured to communicate with a telecommunications device (193) external to the protective enclosure (150) to allow for remote operation of the electromechanical lift device (164).

Clause 39: The driver's protective enclosure (10, 150) according to any one of clauses 28-38, wherein the barrier door (15, 151) further comprises a latch (17, 157) configured to secure the door (15, 151) in a closed position and a latch release control (18, 158) configured to open the latch (17, 157).

Clause 40: The driver's protective enclosure (10) according to any one of clauses 28-39, wherein the barrier door (15) further comprises a ventilation system (69, 120) disposed in the lower section (19), the ventilation system (69, 120) being configured to direct air to or from the protective enclosure (10).

Clause 41: The driver's protective enclosure (10) according to clause 40, wherein the ventilation system (120) comprises at least one blower (111) and a plenum (112).

Clause 42: The driver's protective enclosure (10, 100) according to any one of clauses 28-41, wherein the rear screen (11, 101) comprises an extension (116) adjacent to the hinge structure (14, 105), wherein the extension (116) defines a plenum in fluid communication with an interior and an exterior of the driver's protective enclosure (10, 100), and wherein a vertical tangential blower (117) is positioned in the plenum of the extension (116), the vertical tangential blower (117) being configured to direct air into or out of the driver's protective enclosure (10, 100).

It is to be understood that the invention may assume various alternative variations and step sequences, except where expressly specified to the contrary. It is also to be understood that the specific devices and processes illustrated in the attached drawings, and described in the specification, are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A barrier door for a protective enclosure, the barrier door comprising:
   a lower section; and an upper section comprising an outer stationary portion and an inner movable portion disposed within the outer stationary portion, wherein the outer stationary portion and the inner movable portion are light transmissive, wherein the inner movable portion is movable in a vertical direction and is coupled to a lift device disposed in the lower section, and wherein the lift device is configured to move the inner movable portion between a lowered position in which the inner movable portion is at least partially withdrawn into the lower section to form an opening in the upper section and a raised position in which the inner movable portion is extended to close the opening.

2. The barrier door according to claim 1, further comprising:

a forward channel structure; and a rearward channel structure, wherein the forward channel structure and the rearward channel structure extend vertically to slidably support the inner movable portion, and wherein the forward channel structure is disposed in the lower section and the rearward channel structure is disposed in the lower section and the upper section.

3. The barrier door according to claim 2, wherein a light transmissive channel is disposed on the outer stationary portion of the upper section to slidably support the inner movable portion above the forward channel structure.

4. The barrier door according to claim 2, wherein the forward channel structure comprises a forward support beam and the rearward channel structure comprises a rearward support beam.

5. The barrier door according to claim 4, wherein at least one of the forward support beam or the rearward support beam comprises a plurality of cushioning strips configured to slidably support the inner movable portion within the rearward support beam.

6. The barrier door according to claim 4, wherein the rearward support beam also supports the outer stationary portion above the inner movable portion.

7. The barrier door according to claim 6, wherein the rearward support beam comprises filler plugs to support the outer stationary portion within the rearward support beam.

8. The barrier door according to claim 6, further comprising plural beams configured to mount the outer stationary portion on the lower section, wherein at least two of the beams cooperate to form a corner structure configured to hold a lower, forward corner of the outer stationary portion, and wherein at least one of the beams is configured to cooperate with the rearward support beam to form a corner structure configured to hold an upper, rearward corner of the outer stationary portion.

9. The barrier door according to claim 8, wherein each of the beams comprises an inner clip and an outer clip configured to hold the outer stationary portion therebetween.

10. The barrier door according to claim 4, wherein the lower section comprises an interior panel defining an interior side of the lower section, wherein a portion of the interior panel is disposed within a receiving channel defined within the rearward support beam, and wherein at least one brace is also disposed within the receiving channel.

11. The barrier door according to claim 10, wherein the at least one brace comprises an angled flange configured to be received in a slot defined in the rearward support beam to secure the at least one brace to the rearward support beam.

12. The barrier door according to claim 10, wherein the at least one brace comprises a hook opening configured to engage a pin extending through the rearward support beam to secure the at least one brace to the rearward support beam.

13. The barrier door according to claim 4, wherein the lower section comprises an exterior panel defining an exterior side of the lower section, wherein the exterior panel comprises a curved end and the rearward support beam comprises a corresponding groove defined therein, and wherein the curved end of the exterior panel is received within the corresponding groove of the rearward support beam to secure the exterior panel to the rearward support beam.

14. The barrier door according to claim 4, further comprising a hinge structure mounted on the rearward support beam, wherein the hinge structure comprises upper and lower adjustable brackets connected to the rearward support beam, and wherein the adjustable brackets support spherical hinge pins configured to engage mounting brackets for supporting the door.

15. The barrier door according to claim 14, wherein the spherical hinge pins, the adjustable brackets, and the rearward support beam are configured to accommodate a wiring harness extending from the protective enclosure to an interior of the lower section.

16. The barrier door according to claim 1, wherein the upper section further comprises an anti-rattle pocket disposed on the outer stationary portion, wherein the anti-rattle pocket is configured to engage the inner movable portion in the raised position to limit vibration of the inner movable portion.

17. The barrier door according to claim 1, wherein the lift device comprises an electromechanical lift device.

18. The barrier door according to claim 17, further comprising controls for the electromechanical lift device.

19. The barrier door according to claim 1, further comprising a latch configured to secure the door in a closed position and a latch release control configured to open the latch.

20. The barrier door according to claim 1, further comprising a latch configured to secure the door in a closed position and a latch release control configured to open the latch comprising an actuation lever configured to open the latch and an additional control knob configured to be manually engaged to disable the latch release control.

21. The barrier door according to claim 1, further comprising a latch configured to secure the door in a closed position and a latch release control configured to open the latch comprising an actuation lever configured to open the latch and an additional control knob which is configured to be automatically engaged to disable the latch release control.

22. The barrier door according to claim 1, further comprising a ventilation system disposed in the lower section, the ventilation system being configured to direct air to or from the protective enclosure.

23. The barrier door according to claim 22, wherein the ventilation system comprises at least one blower and a plenum.

24. A protective enclosure for a vehicle, the protective enclosure comprising:

a rear screen disposed behind a driver's position in the vehicle;

a barrier door comprising a lower section and an upper section, the upper section comprising an outer stationary portion and an inner movable portion disposed within the outer stationary portion; and a hinge structure connecting the barrier door to the rear screen, wherein the outer stationary portion and the inner movable portion are light transmissive, wherein the inner movable portion is movable in a vertical direction and is coupled to a lift device disposed in the lower section, and wherein the lift device is configured to move the inner movable portion between a lowered position in which the inner movable portion is at least partially withdrawn into the lower section to form an opening in the upper section and a raised position in which the inner movable portion is extended to close the opening.

25. The protective enclosure according to claim 24, wherein the barrier door also includes a forward channel structure and a rearward channel extending vertically to slidably support the inner movable portion, wherein the forward channel structure is disposed in the lower section and the rearward channel structure is disposed in the lower section and the upper section.

26. The protective enclosure according to claim 25, wherein a light transmissive channel is disposed on the outer stationary portion of the upper section to slidably support the inner movable portion above the forward channel structure.

27. The driver's protective enclosure according to claim 24, wherein the hinge structure comprises:

upper and lower adjustable brackets connected to the barrier door and supporting spherical hinge pins; and mounting brackets connected to the rear screen, wherein the spherical hinge pins rotatably engage the mounting brackets to support the barrier door on the rear screen.

28. The protective enclosure according to claim 27, wherein the spherical hinge pins, the adjustable brackets, and the lower section of the barrier door are configured to accommodate a wiring harness extending from the rear screen to an interior of the lower section.

29. The protective enclosure according to claim 24, wherein the lift device comprises an electromechanical lift device.

30. The protective enclosure according to claim 29, further comprising controls for the electromechanical lift device disposed on the lower section of the barrier door.

31. The protective enclosure according to claim 30, further comprising additional controls for the electromechanical lift device disposed on the protective enclosure away from the barrier door.

32. The protective enclosure according to claim 31, wherein the additional controls are disposed on at least one of a vehicle dashboard, a driver's side panel, or the rear screen.

33. The protective enclosure according to claim 29, further comprising controls for the electromechanical lift device disposed away from the door on at least one of a vehicle dashboard, a driver's side panel, or the rear screen.

34. The protective enclosure according to claim 29, wherein a controller configured to operate the electromechanical lift device is disposed within the lower section of the barrier door, and wherein the controller is configured to communicate with a telecommunications device external to the protective enclosure to allow for remote operation of the electromechanical lift device.

35. The protective enclosure according to claim 24, wherein the barrier door further comprises a latch configured to secure the door in a closed position and a latch release control configured to open the latch.

36. The protective enclosure according to claim 24, wherein the barrier door further comprises a ventilation system disposed in the lower section and configured to direct air to or from the protective enclosure.

37. The protective enclosure according to claim 36, wherein the ventilation system comprises at least one blower and a plenum.

38. The protective enclosure according to claim 24, wherein the rear screen comprises an extension adjacent to the hinge structure, wherein the extension defines a plenum in fluid communication with an interior and an exterior of the protective enclosure, and wherein a vertical tangential blower is positioned in the plenum of the extension, the vertical tangential blower being configured to direct air into or out of the protective enclosure.

* * * * *